(12) United States Patent
Ito et al.

(10) Patent No.: US 6,191,941 B1
(45) Date of Patent: *Feb. 20, 2001

(54) ELECTRONIC DEVICE AND ELECTRONIC DEVICE BATTERY

(75) Inventors: Susumu Ito; Makoto Tanahashi, both of Kanagawa; Teiyu Goto, Saitama; Tsutomu Asawa, Nagano, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/162,111

(22) Filed: Sep. 28, 1998

(30) Foreign Application Priority Data

Sep. 29, 1997 (JP) .................................................. 9-263885

(51) Int. Cl.[7] ................ H05K 5/00; H05K 7/00
(52) U.S. Cl. .................... 361/683; 312/223.1; 429/99; 429/100; 429/96
(58) Field of Search ................................. 361/683, 686; 312/223.1, 223.2; 429/96, 99, 100

(56) References Cited

U.S. PATENT DOCUMENTS

| | | | | |
|---|---|---|---|---|
| 5,107,401 | * | 4/1992 | Youn | 361/393 |
| 5,255,214 | * | 10/1993 | Ma | 364/708.1 |
| 5,293,300 | * | 3/1994 | Leung | 361/683 |
| 5,506,749 | * | 4/1996 | Matsuda | 361/683 |
| 5,583,744 | * | 12/1996 | Oguchi et al. | 361/683 |
| 5,642,258 | * | 6/1997 | Barrus et al. | 361/683 |

* cited by examiner

Primary Examiner—Leo P. Picard
Assistant Examiner—Tung Minh Bui
(74) Attorney, Agent, or Firm—Frommer Lawrence & Haug, LLP.; William S. Frommer; Matthew K. Ryan

(57) ABSTRACT

A portable electronic device including a body, and a display portion which is openably and closably provided with respect to the body, wherein a short battery portion is provided at the back end of the body, and a long battery portion is rotatably provided with respect to the short battery portion; and an electronic device battery. In the electronic device and the electronic device battery, a simple structure for electrically connecting the battery to the body can be used to support the back end of the body of the electronic device above a supporting surface in order to easily tilt the body.

27 Claims, 25 Drawing Sheets

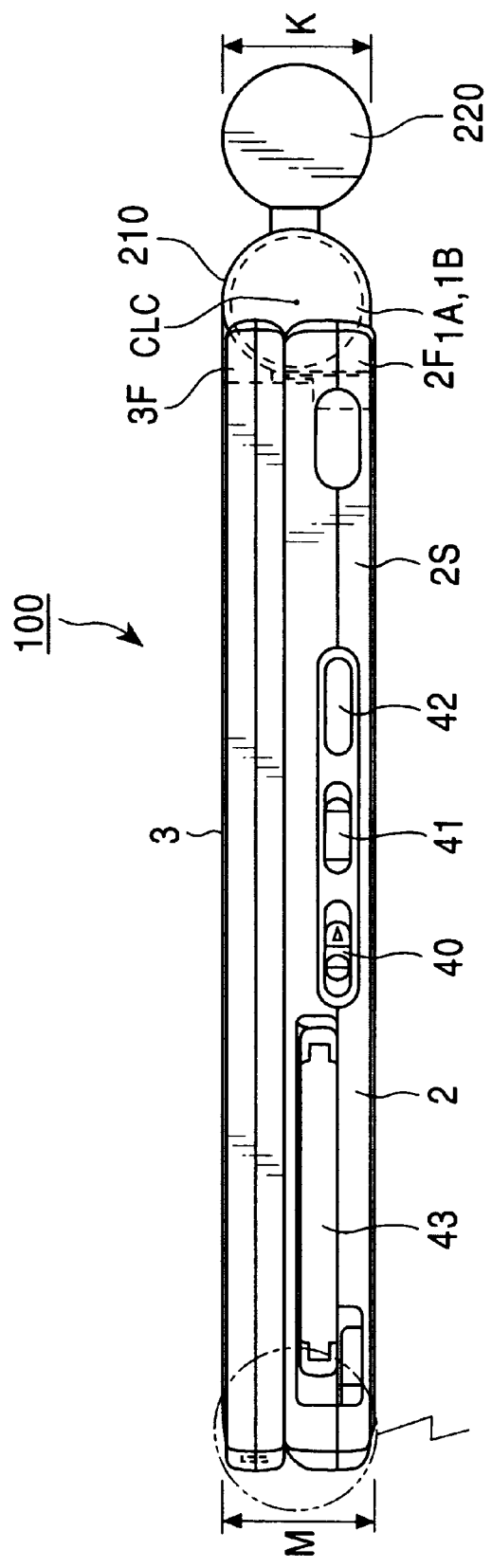
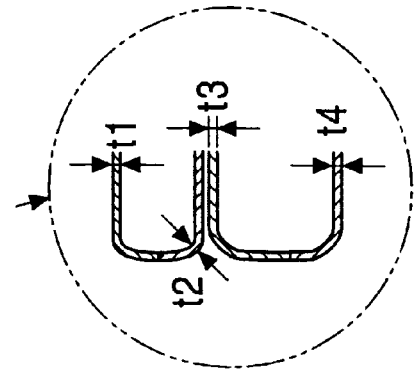
FIG. 2A
FIG. 2B

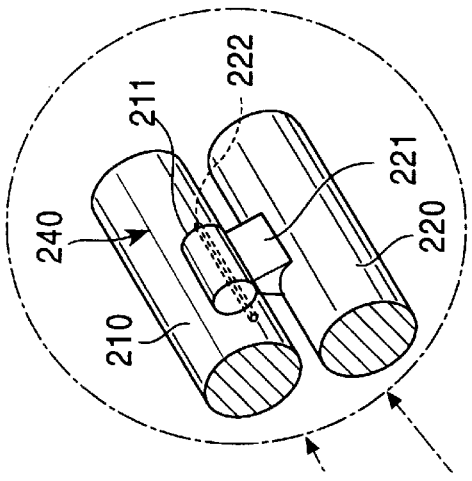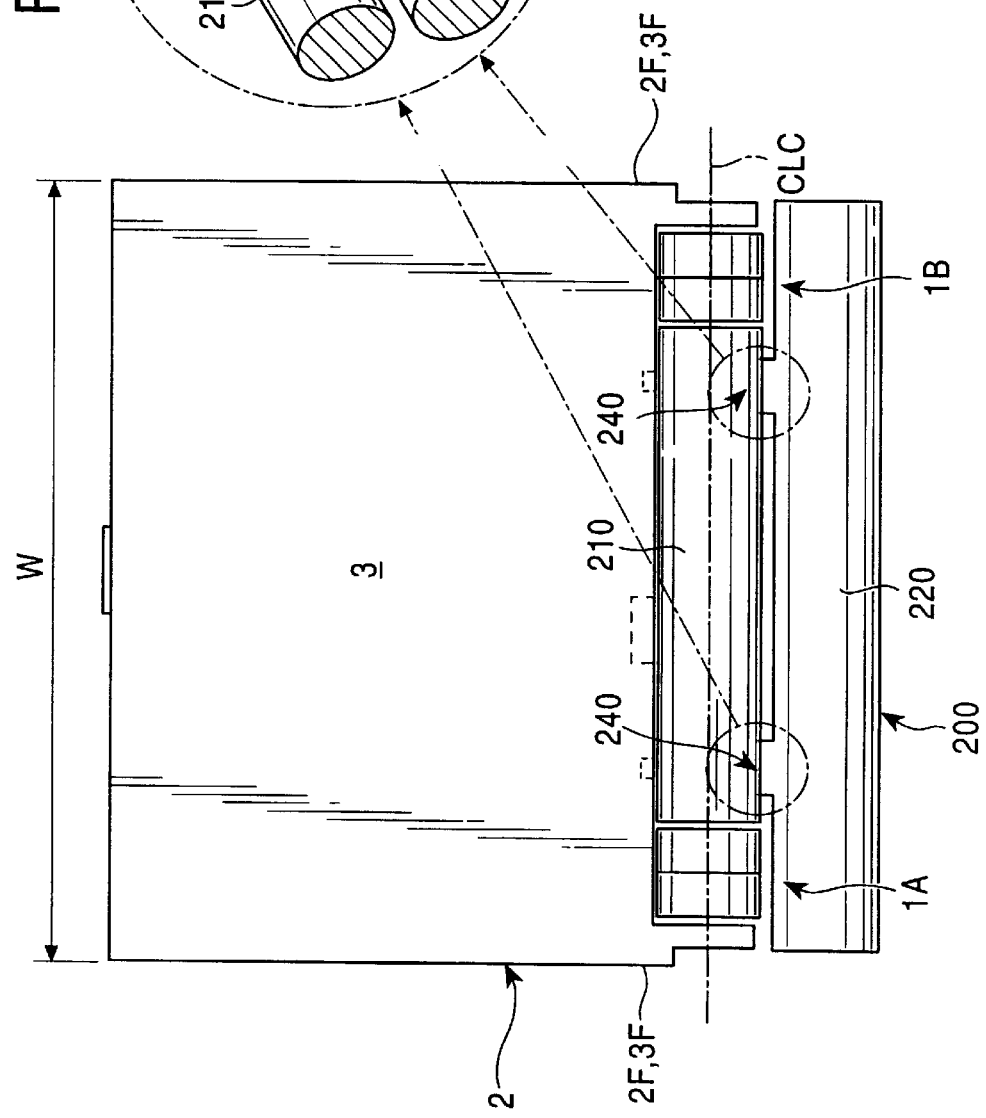
FIG. 3A
FIG. 3B

ELECTRONIC DEVICE AND ELECTRONIC DEVICE BATTERY

BACKGROUND OF THE INVENTION

1. Field of the Invention

The present invention relates to a portable electronic device including a body and a display portion which is openably and closably provided with respect to the body, and an electronic device battery.

2. Description of the Related Art

In recent years, many types of portable electronic devices have been on sale. Sophisticated electronic devices having built therein a central processing unit (CPU) are available. Such electronic devices consume a large amount of electrical power when they are driven.

For example, a portable computer, being a type of portable electronic device, includes a body and a display portion that can be opened and closed with respect to the display portion through hinges. A typical example of such portable computers is the so-called notebook personal computer.

In order to drive the body and the display portion of such portable computers, batteries are mounted to such portable computers. A battery pack, for driving the body and the display portion, is set, for example, at the outer portion of the body. Such battery packs range from those having a large capacity to those having a small capacity. When the capacity of the battery pack is to be made large, many battery cells are mounted, resulting in an externally large and heavy battery pack. When, on the other hand, the capacity of the battery pack is to be made small, a small number of battery cells are mounted, resulting in a relatively externally small and light battery pack.

Since a large capacity battery pack contains a large number of battery cells, the battery cells are in general placed in a plurality of rows.

An example of a portable computer provided with such a battery pack is disclosed in Japanese Unexamined Patent Publication No. 8-76898. The battery pack 2004, disclosed therein, is electrically connected to the body 2000 of the computer, as shown in FIGS. 27 and 28.

However, the use of such a battery pack 2004 results in the following problem. The battery pack 2004 is integrally formed with the body 2000 of the computer, and the entire battery pack 2004 is rotatably mounted to the computer body 2004. By rotating the entire battery pack 2004 with respect to the body 2000 in the direction of arrow Y, the back end portion of the body 2000 is supported above, for example, a desk, and tilted. Accordingly, the heavy battery pack 2004, as a whole, must be rotated with respect to the body 2000. Therefore, the computer has poor operability.

In the portable computer of FIGS. 27 and 28, the battery pack 2004 is mounted to the back end of the body 2000. The battery pack 2004 is positioned at the back ends of the body 2000 and the display portion 2004. The entire battery pack 2004 can be rotated with respect to the body 2000 and the display portion 2003 by an angle of 90 degrees in the direction of arrow Y of FIG. 27. Such rotation of the battery pack 2004 causes the back end of the body 2000 to be raised from a supporting surface and the body 2000 to be tilted.

When such a structure is adopted, the entire battery pack 2004 must be electrically and mechanically, as well as rotatably, connected to the back end of the body 2000. Therefore, it is necessary to provide rotating electrodes 2005 at the battery pack 2004, as well as rotating connectors 2006 at the body 2000 side. Accordingly, since it is necessary to provide a structure for rotatably and removably mounting the battery pack 2004 to the body 2000, as well as special coaxial, circular rotating electrodes 2005 and rotating connectors 2006, the structure becomes very complicated, and electrical contact failure may result between the rotating electrodes 2005 and the rotating connectors 2006 when the battery pack 2004 is repeatedly rotated.

In the conventional structure, it is necessary to rotatably support the battery pack 2004, and use a special annular contact structure for maintaining rotatable electrical contact. As a result, for example, the structure becomes complicated, a larger number of parts are used, production costs are increased, the relatively massive battery pack 2004 becomes less durable as a result of concentrated stress exerted thereon when it is supported.

SUMMARY OF THE INVENTION

Accordingly, it is an object of the present invention to provide an electronic device and an electronic device battery, which can overcome the above-described problems, wherein a simple structure for electrically connecting a battery portion to a body allows the back end of the body of the electronic device to be easily supported above a supporting surface and the body to be tilted as a result of rotating part of the battery.

To this end according to one aspect of the present invention, there is provided an electronic device comprising a body; a display portion which is openably and closably provided with respect to the body; a first battery portion which is provided at the back end of the body; and a second battery portion which is rotatably supported by the first battery portion.

In the one aspect of the present invention, a first battery portion is provided at the back end of the body of the electronic device, and a second battery portion is rotatably supported by the first battery portion. Accordingly, a simple structure can be used to support the first battery portion and the back end of the battery above a supporting surface, and tilt the body, by rotating the second battery portion. Raising the back end of the body in order to tilt and support the body allows the body to be operated more easily.

Although not exclusive, in a preferred form of the invention, the first battery portion may be removably disposed between at least one pair of opening-and-closing mechanical portions which openably and closably support the display portion with respect to the body.

Since the first battery portion can be removably mounted between at least a pair of opening-and-closing mechanical portions, the first battery portion and the second battery portion can be easily mounted to and removed from the body. The outside dimensions of the second battery portion can be the same as the outside dimensions of the opening-and-closing mechanical portions, thereby allowing the battery capacity to be increased, without increasing the thickness of the electronic device.

Although not exclusive, in another preferred form, the at least one pair of opening-and-closing portions may include hinge mechanisms.

Although not exclusive, in still another preferred form, the second battery portion, which has been rotated with respect to the first battery portion, may support the back end of the body above the supporting surface in order to tilt and support the body with respect to the supporting surface.

This allows the second battery portion to raise the back end of the body above a supporting surface in order to tilt and support the body with respect to the supporting surface. When the first battery portion is removably disposed between the opening-and-closing portions, and the display portion is to be rotated by more than 180 degrees with respect to the body as a result of rotating the second battery portion with respect to the first battery portion, it is possible to prevent breakage of the display portion, the body, and the second battery portion, since the display portion does not come into contact with the second battery portion.

Although not exclusive, in still another preferred form, the first battery portion, disposed between the hinges, may be mechanically and electrically connected at the body side so as to be removable from the body.

Although not exclusive, in still another preferred form, the first battery portion may be removably provided by making the first battery portion slidable with respect to the opening-and-closing mechanical portions disposed at the body.

This allows the first battery portion and the second battery portion to be easily mounted to and removed from the opening-and-closing mechanical portions disposed at the body.

Although not exclusive, in still another preferred form, the electronic device may further comprise antirotation means for automatically preventing rotation of the second battery portion with respect to the first battery portion, while the back end of the body is supported above the supporting surface as a result of rotating the second battery portion with respect to the first battery portion.

The antirotation means prevents rotation of the second battery portion with respect to the first battery portion, when the second battery portion is rotated with respect to the first battery portion in order to raise the back end of the body from the supporting surface. Consequently, the antirotation means prevents the second battery portion from returning back to its original state. As a result, the body can be reliably supported in a tilted state with respect to the supporting surface, using the second battery portion.

Although not exclusive, in still another preferred form, the electronic device may be a portable computer.

Although not exclusive, in still another preferred form, the display portion may include a liquid crystal display.

Although not exclusive, in still another preferred form, the first battery portion may have an electrically connecting terminal which is electrically connected to an electrically connecting terminal of the body, and the electronic device may further comprise a guiding mechanical portion for removably mounting the ends of the first battery portion to the at least one pair of opening-and-closing mechanical portions.

This makes it possible to prevent breakage of the electrically connecting terminals caused by stress produced when the electrically connecting terminal of the battery is being mounted to the electrically connecting terminal of the body.

Although not exclusive, in still another preferred form, the first battery portion may have grooves formed in the ends thereof, and the at least one pair of opening-and-closing mechanical portions may have protrusions which are mechanically fitted to the corresponding grooves at the ends of the first battery portion.

This makes it possible to use a simple structure to prevent breakage of the electrically connecting terminals caused by stress produced when the electrically connecting terminal of the first battery portion is being mounted to the electrically connecting terminal of the body.

Although not exclusive, in still another preferred form, the first battery portion may have a mounting portion, the mounting portion being disposed in the vicinity of the electrically connecting terminal of the first battery portion and being fitted into a recess of the body.

This allows the first battery portion to be reliably positioned and secured to the body, through the mounting portion of the first battery portion and the recess of the body.

Although not exclusive, in still another preferred form, the mounting portion and the electrically connecting terminal of the first battery portion may be formed in a row on a surface of the battery which contacts the back end of the body.

This allows the first battery to be secured to the body using a mounting portion and the first battery to be electrically connected to the body using an electrically connecting terminal, by only bringing the contact surface of the first battery portion into contact with the back end of the body.

Although not exclusive, in still another preferred from, the first battery portion may be removably provided by making the first battery portion movable between the at least one pair of opening-and-closing mechanical portions, disposed at the body, in straight lines, through the guiding mechanical portion.

This allows the first battery portion to be reliably and simply mounted to and removed from the body, by simply moving the first battery portion in straight lines with respect to the body.

According to another aspect of the present invention, there is provided an electronic device battery which is used by removably mounting the electronic device battery with respect to a portable electronic device comprising a body and a display portion which is openably and closably provided with respect to the body, the electronic device battery, comprising: a first battery portion which is disposed at the back end of the body; and a second battery portion which is rotatably supported by the first battery portion.

This makes it possible to use a simple structure to raise the first battery portion and the back end of the body and tilt and support the body. By raising the back end of the body in order to tilt and support the body, the body can be operated more easily.

Although not exclusive, in a preferred form, the first battery portion may be disposed between the at least one pair of opening-and-closing mechanical portions which openably and closably support the display portion with respect to the body.

Although not exclusive, in another preferred form, the second battery portion, which has been rotated with respect to the first battery portion, may support the back end of the body of the electronic device above the supporting surface in order to tilt and support the body with respect to the supporting surface.

Although not exclusive, in still another preferred form, the first battery portion, disposed between the at least one pair of opening-and-closing mechanical portions, may be mechanically and electrically connected at the body side of the electronic device so as to be removable from the body.

Although not exclusive, in still another preferred form, the first battery portion may be removably provided by making the first battery portion slidable with respect to the at least one pair of opening-and-closing mechanical portions disposed at the body.

Although not exclusive, in still another preferred form, the electronic device battery may further comprise antirotation means for automatically preventing rotation of the second battery portion while the back end of the body is supported above the supporting surface as a result of rotating the second battery portion with respect to the first battery portion.

BRIEF DESCRIPTION OF THE DRAWINGS

FIG. 2 is a side view of a computer that serves as the electronic device of FIG. 1.

FIG. 3 is a plan view of the body, the display portion, and the battery portions.

DESCRIPTION OF THE PREFERRED EMBODIMENTS

A description will now be given of preferred embodiments of the present invention with reference to the appended drawings.

Since the embodiments to be described below are preferred embodiments of the present invention, various specific technological forms are described below. However, unless otherwise specified, these technological forms in no way limit the scope of the present invention.

Figure 1:
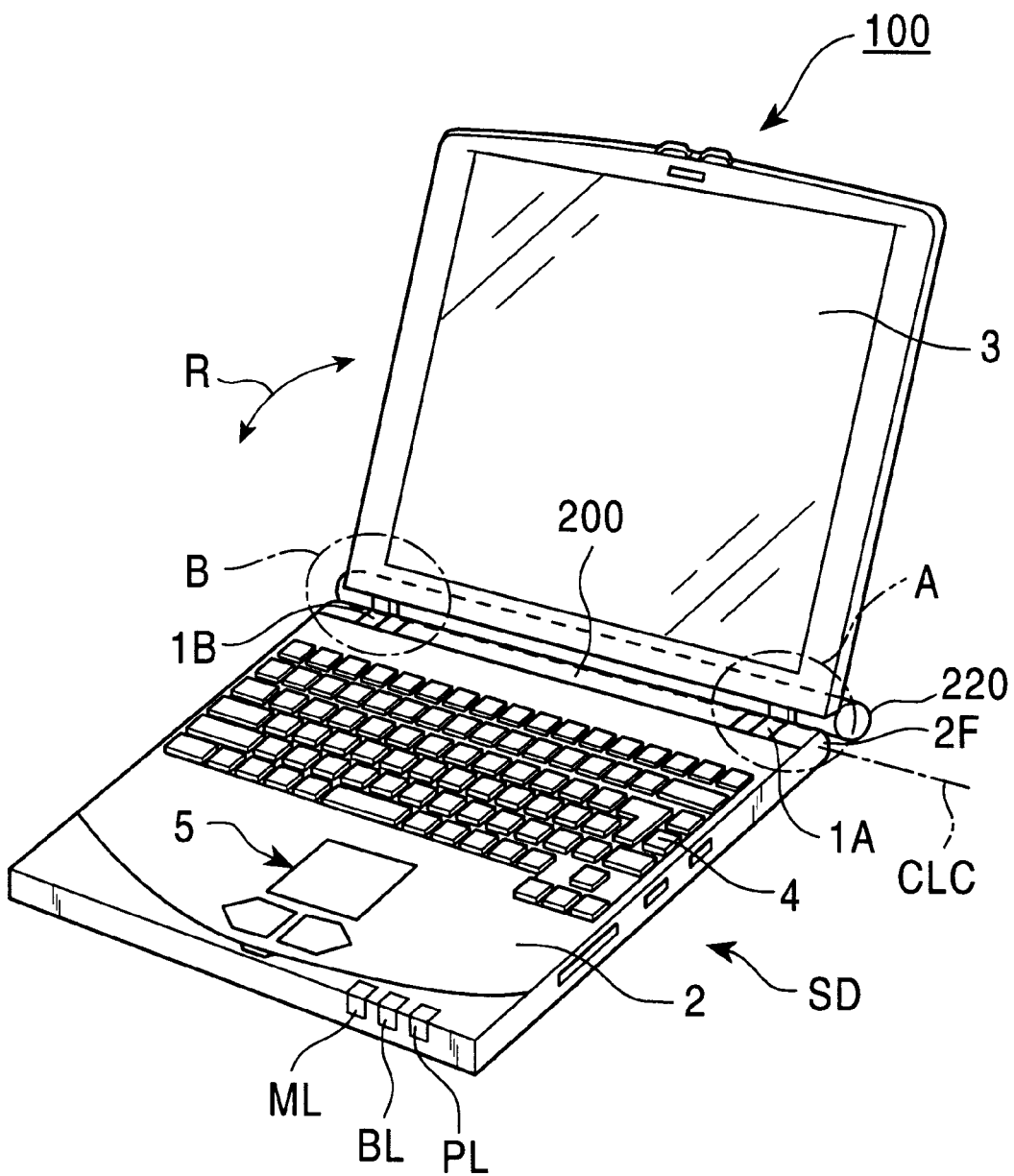
FIG. 1 is a perspective view of an embodiment of the electronic device in accordance with the present invention.

FIG. 1 illustrates an electronic device in accordance with the present invention. The electronic device of FIG. 1 is a portable computer 100. The portable computer 100 includes a body 2, a display portion 3, a keyboard 4, hinges 1A and 1B within areas A and B, and a battery pack 200, etc.

The body 2 has the aforementioned keyboard 4 and a pointing device 5 or the like, and the display portion 3 may be, for example, a liquid crystal display (LCD) portion. The hinges 1A and 1B (first opening-and-closing portion and second opening-and-closing portion) are mounted to the body 2 so as to allow opening and closing operations in the directions of a double-headed arrow R. Although not illustrated in FIG. 1, a device, such as a mouse being an externally mounting type pointing means, may be set with respect to the body 2 from outside the electronic device. The body 2 has a power supply lamp PL, a battery lamp BL, and a message lamp ML, with the battery lamp BL indicating the amount of power left in the battery pack 200.

FIG. 2 illustrates the display portion 3 of the electronic device of FIG. 1 being folded onto the body 2, with a center axis CLC as center, as viewed in a direction of arrow SD. In FIG. 2, at a side face 2S of the body 2 are disposed a power supply switch 40, and other switches 41 and 42. In addition, at the side face 2S is disposed a slot 43 for inserting therein an electronic card (PC card).

Figure 6:
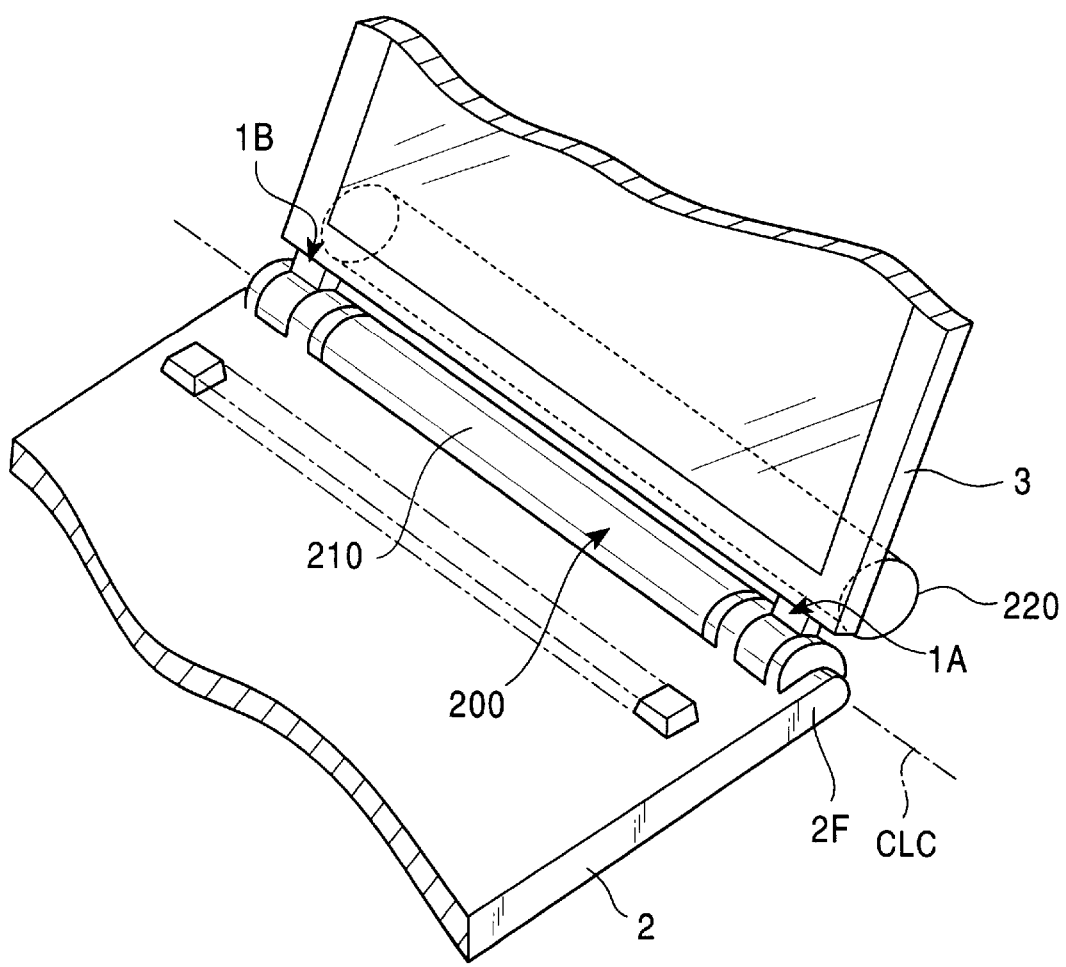
FIG. 6 is a perspective view of part of the structure formed by the body, the battery portions, and the display portion.

Between the hinges 1A and 1B of FIG. 1 is disposed a battery pack (battery) 200. As shown in FIGS. 2, 3, and 6, the battery pack 200 comprises a substantially cylindrical, long battery portion (corresponding to a second battery portion) 220 and a substantially cylindrical short battery portion (corresponding to a first battery portion) 210. Between the hinges 1A and 1B, the short battery portion 210 is secured to a back end 2F of the body 2 so as to be mechanically and electrically removable therefrom.

As shown in FIG. 2, the thickness of a case of the body 2 and the thickness of a case of the display portion 3 are set as follows. Thickness t1 is set at 1.2 mm, thickness t2 is set at 1.0 mm, thickness t3 is set at 1.0 mm, and thickness t4 is set at 1.2 mm.

The total sum M of the thicknesses of the body 2 and the display portion 3 is substantially the same as diameter K of the long battery portion 220 (and the short battery portion 210).

The short battery portion 210 is removably set between the hinges 1A and 1B, and the diameters of the hinges 1A and 1B are about the same as the diameter of the short battery portion 210. Therefore, the capacity of the short battery portion 210 can be made large in correspondence with the range of thickness M.

As shown in FIG. 3, the long battery portion 220 is rotatably supported with respect to the short battery portion 210, through hinge mechanisms 240. More specifically, the long battery portion 220 is rotatably joined by fitting protrusions 221 of the long battery portion 220 to corresponding recesses 211 in the short battery portion 210 and rotatably linking the protrusions 221 to their corresponding recesses 211 using, for example, pins 222.

In the long battery portion 210, a plurality of secondary battery cells are arranged. Similarly, in the short battery portion 220, a plurality of secondary battery cells are arranged. The secondary batteries may be, for example, lithium ion secondary batteries. The short battery portion 210 is disposed between the hinges 1A and 1B. The length of the long battery portion 220 may be about the same as width W of the body 2 and the display portion 3. In addition, the diameter of the short battery portion 210 may be about the same as the diameter of the long battery portion 220. Therefore, the battery capacity can be made as large as possible.

Figure 4:
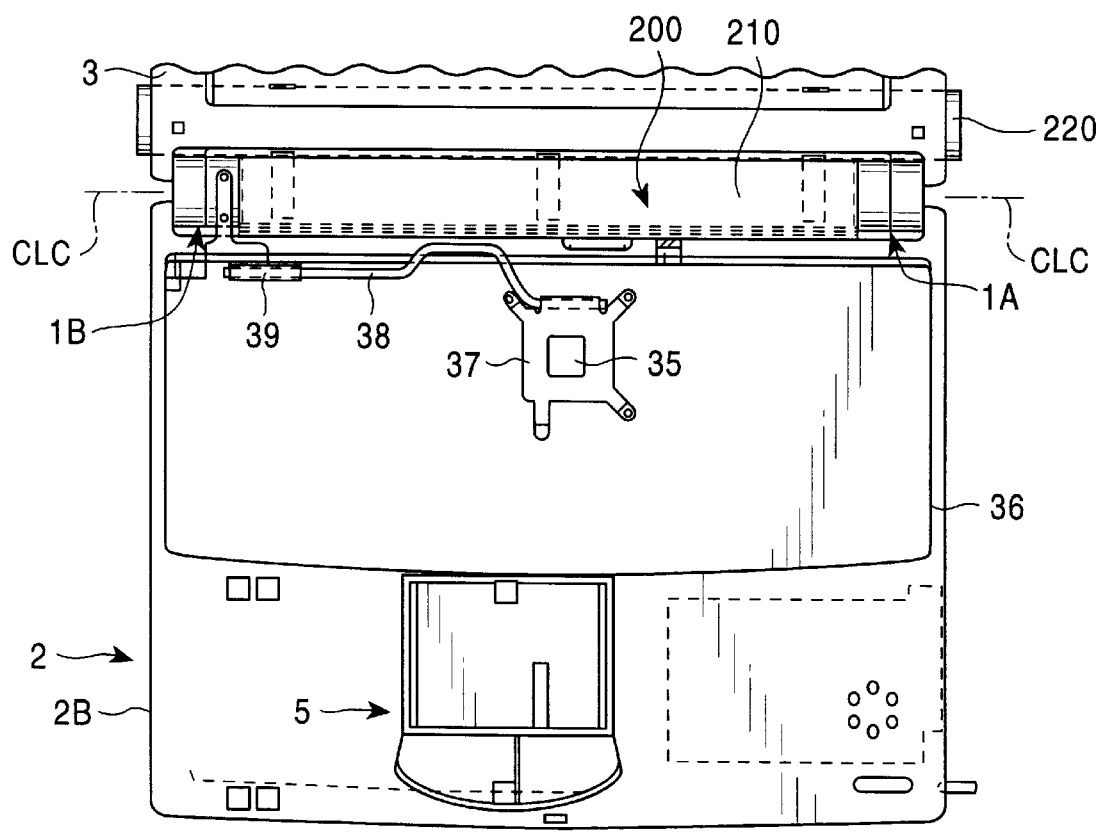
FIG. 4 is a plan view of part of the body, the battery portions, and the display portion.
Figure 5:
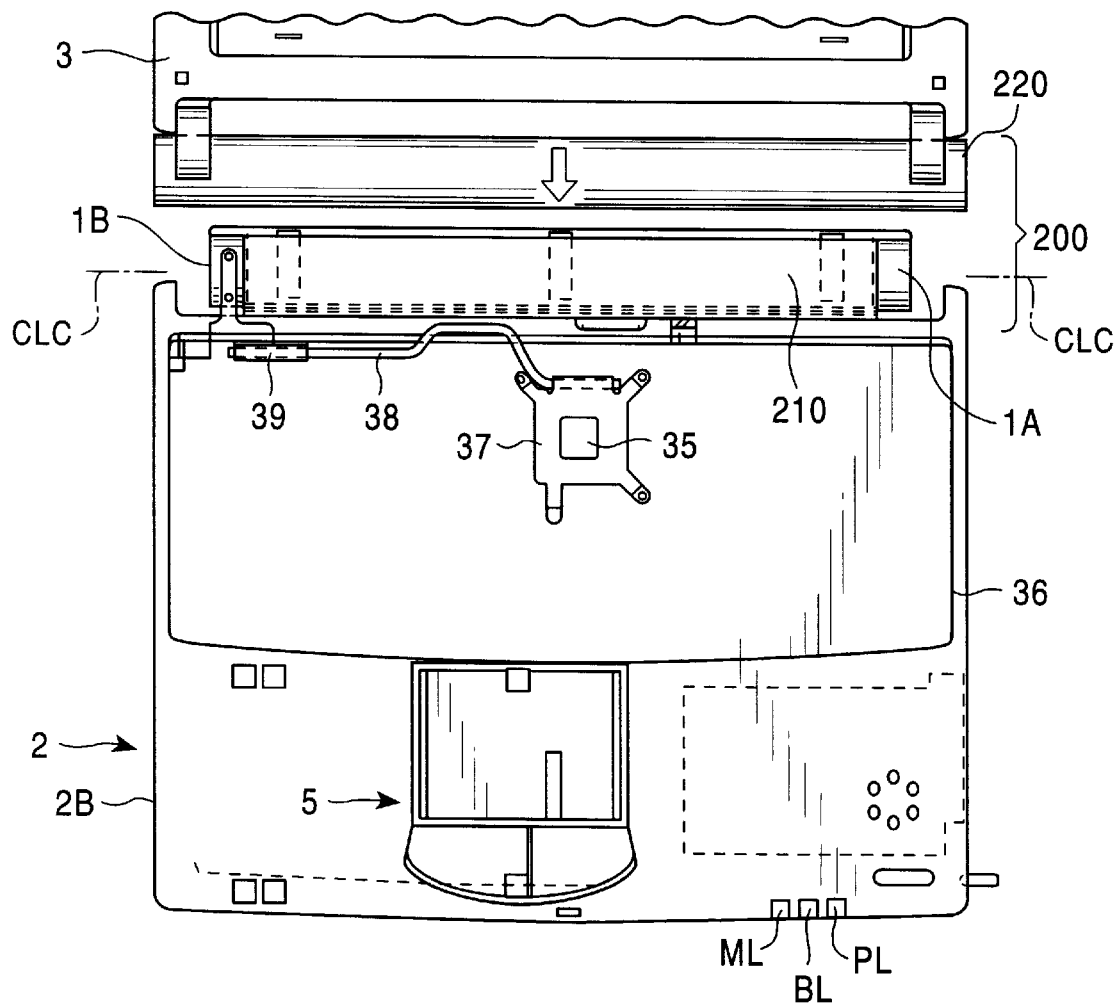
FIG. 5 is a plan view of the body and the display portion being separated from the body.
Figure 7:
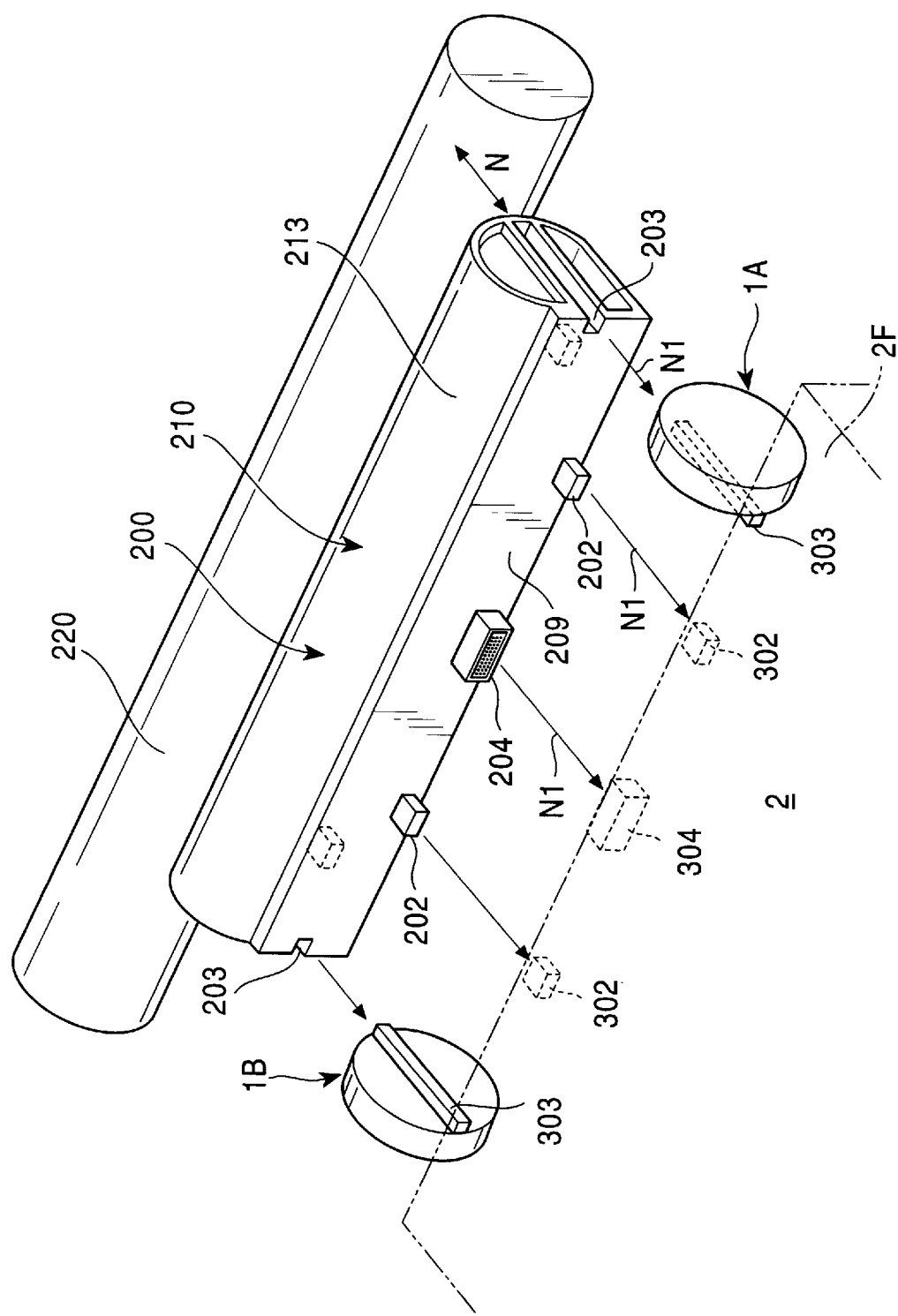
FIG. 7 is a perspective view of the form and mechanism for electrically and mechanically setting the battery portions with respect to the body.

A description will now be given of the mechanism for removably securing the short battery portion 210 to the hinges 1A and 1B, with reference to FIGS. 7 to 12. (It is to be noted that, as shown in FIGS. 4 and 5, the short battery portion 210 is secured such that its center axis CLC coincides with the rotational axis that corresponds to the center of rotation of the hinges 1A and 1B. The securing mechanism is shown in FIG. 7. The short battery portion 210 of the battery pack 200 has a case 213 made of, for example, plastic, with grooves 203 being formed in both ends of the case 213. A contact surface 209 is axially provided at one side of the case 213, and has formed thereat two mounting portions 202 and a protruding electrically connecting terminal 204.

On the other hand, the back end 2F of the body 2 has provided thereat recesses 302 and a recessed electrically connecting terminal 304. The mounting portions 202 can be fitted into their corresponding recesses 302, and the electrically connecting terminal 204 can be fitted to the recessed electrically connecting terminal 304 in order to be electrically connected thereto. The grooves 203 can be fitted to their corresponding protrusions 303 of the hinges 1A and 1B. Accordingly, the short battery portion 210 can be reliably secured to the back end 2F of the body 2. At the body 2 side, the long battery pack 220 and the short battery portion 210 of the battery pack 200 are mechanically and electrically firmly secured together so as to be removable from the body 2, through the grooves 203, the mounting portions 202, and the electrically connecting terminal 204. With the battery pack 200 being mounted to the body in the above-described manner, electrical driving power is supplied from the battery pack to the body 2, through the electrically connecting terminal 204.

In other words, the mounting portions 202 are mechanically fitted into their respective recesses 302 in the body 2, and the electrically connecting terminal 204 is electrically connected to the electrically connecting terminal 304 of the body 2.

In addition, the grooves 203 and the protrusions 303 allow the battery pack 200 to be guided. Therefore, it is possible to prevent breakage of the electrically connecting terminals 204 and 304 caused by stress produced when the electrically connecting terminal 204 of the battery pack 200 is being mounted to or removed from the electrically connecting terminal 304.

Since the battery pack 200 is removably provided between the hinges 1A and 1B (being opening-and-closing mechanical portions), the display portion 3 can be opened with respect to the body 2 by more than 180 degrees. For example, when a user places the body 2 on his or her knees in order to open the display portion 3 with respect to the body 2 in the direction of arrow R of FIG. 16B by more than 180 degrees, the long display portion 220 rotates with respect to the short display portion 210 by, for example, about 90 degrees, as shown in FIG. 16B. This allows the user to operate the keyboard of the body 2 while looking at the display portion 3, with the display portion 3 being opened with respect to the body 21 in the direction of arrow R by more than 180 degrees. As a result, the computer can be operated more easily.

Even if the display portion 3 is rotated with respect to the body 2 by more than 180 degrees in the direction of arrow R, the display portion 3 does not come into contact with the long battery portion 220, thereby preventing breakage of the joining parts of the display portion 3, the battery pack 200, and the body 2, and breakage of the battery and the display portion themselves.

Figure 8:
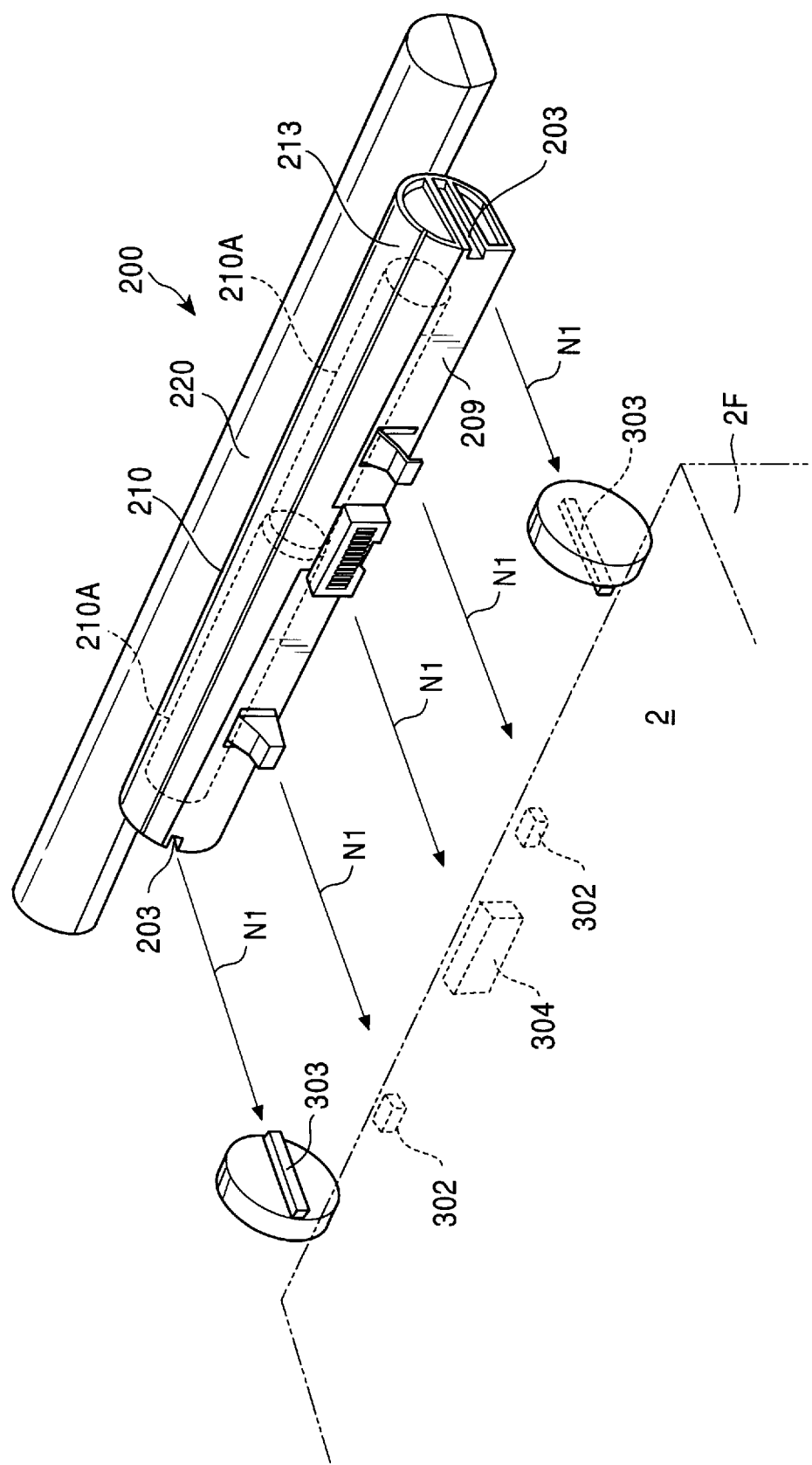
FIG. 8 is a perspective view showing in more detail the form and mechanism for electrically and mechanically setting the battery portions with respect to the body.

FIG. 8 shows in more detail the form of the battery pack 200 of FIG. 7. The short battery portion 210 incorporates, for example, two battery members 210A, while the long battery portion 220 incorporates, for example, three battery members (now shown).

Figure 13:
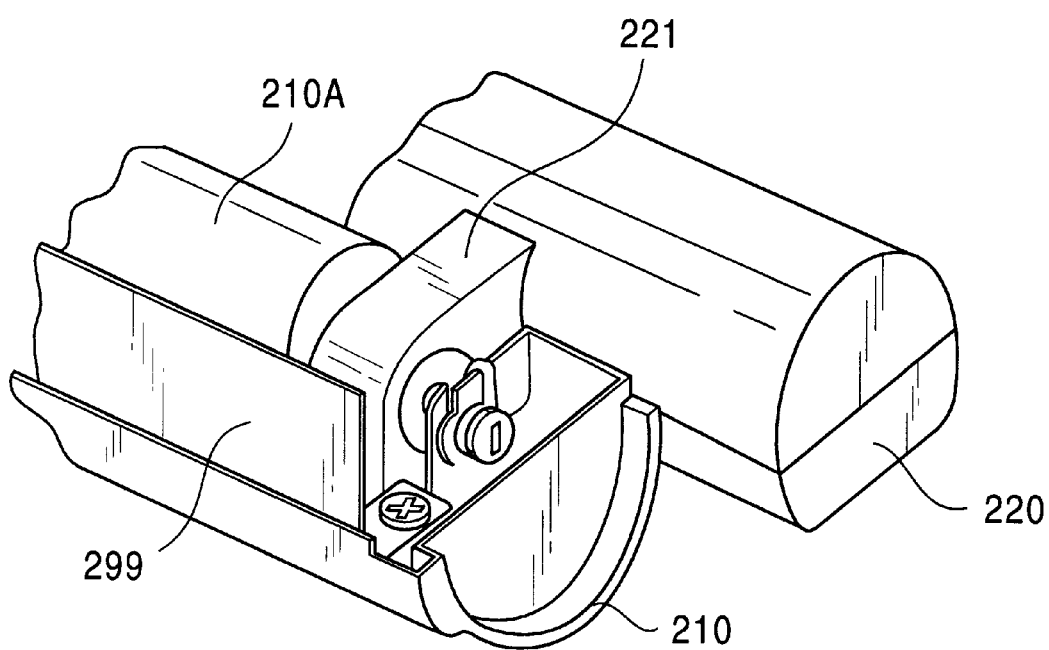
FIG. 13 illustrates a connecting portion of the long battery portion and the short battery portion.

FIG. 13 shows the protrusion 221 and other portions around the battery member 210A. The protrusion 221 joins the battery portions 210 and 220. A circuit board 299 is disposed in the case of the short battery portion 210.

Figure 9:
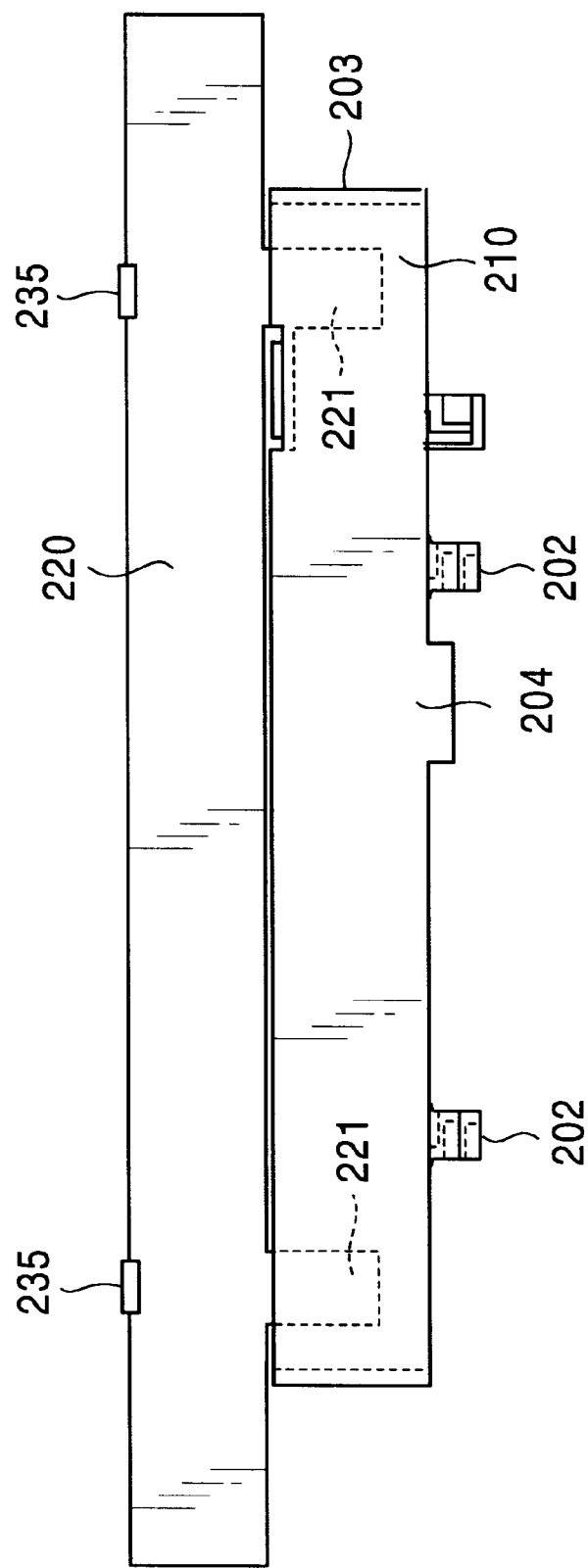
FIG. 9 is a plan view of the battery portions of FIG. 7.
Figure 10:
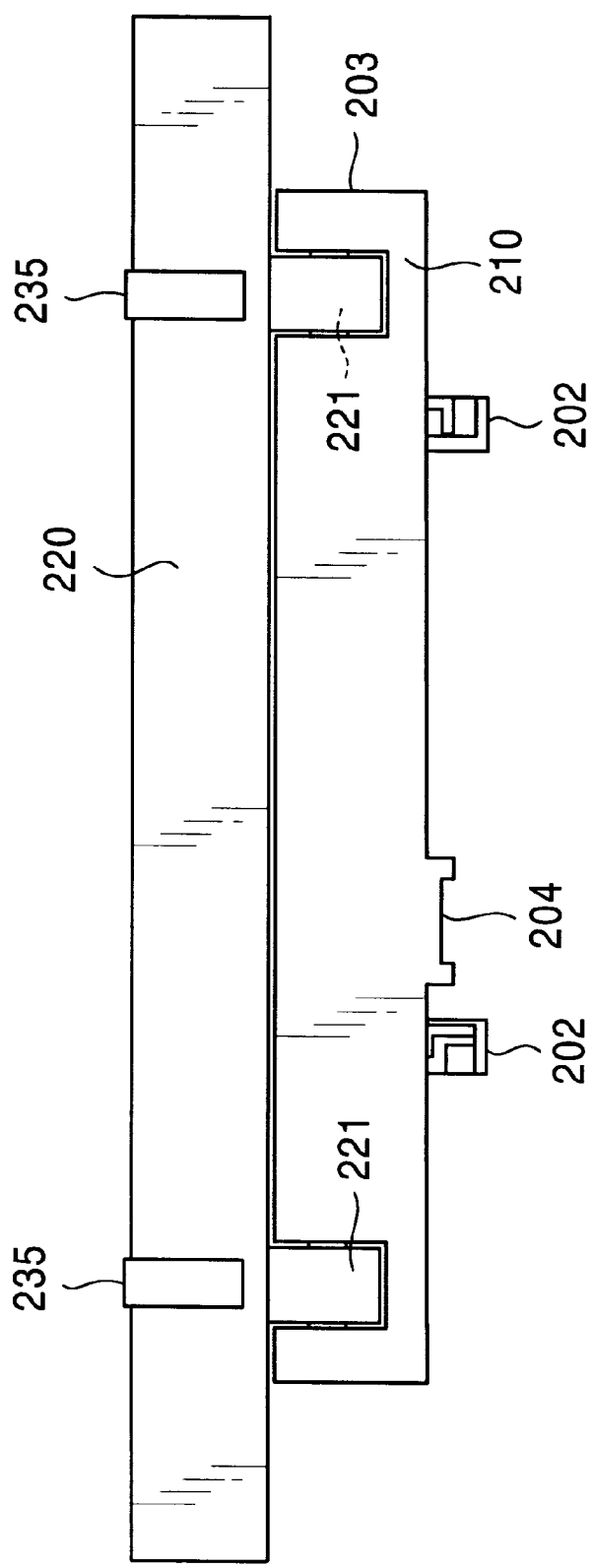
FIG. 10 is a bottom view of the battery portions of FIG. 7.
Figure 11:
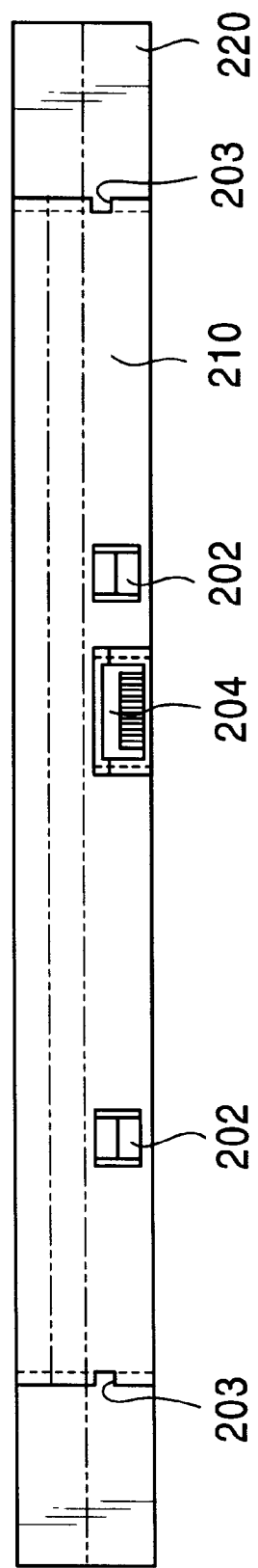
FIG. 11 is a front view of the battery portions.
Figure 12:
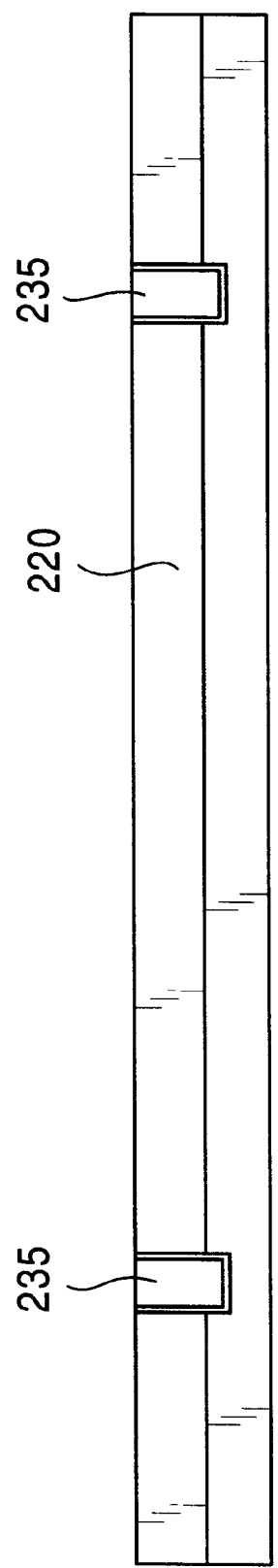
FIG. 12 is a rear view of the battery portions.

As shown in FIGS. 9 and 10, the long battery portion 220 has anti-slippage means 235. These anti-slippage means 235 are made of, for example, rubber with a high frictional resistance. The anti-slippage means 235 are provided to firmly support the body when it is being tilted, as shown in FIGS. 14, 15, and 16.

Figure 14:
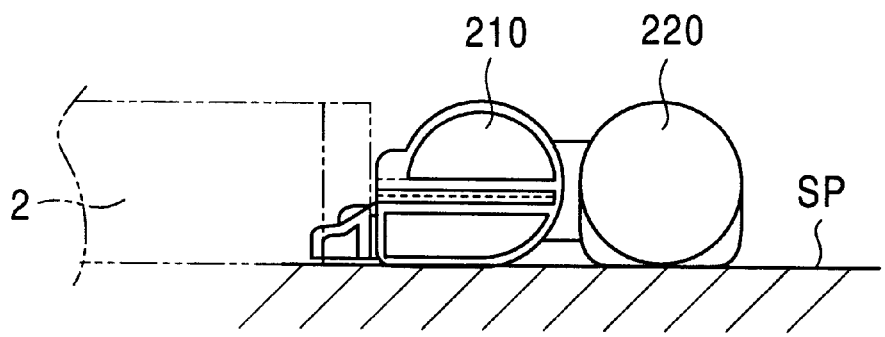
FIG. 14 illustrates the battery portions being placed on a supporting surface.
Figure 16A:
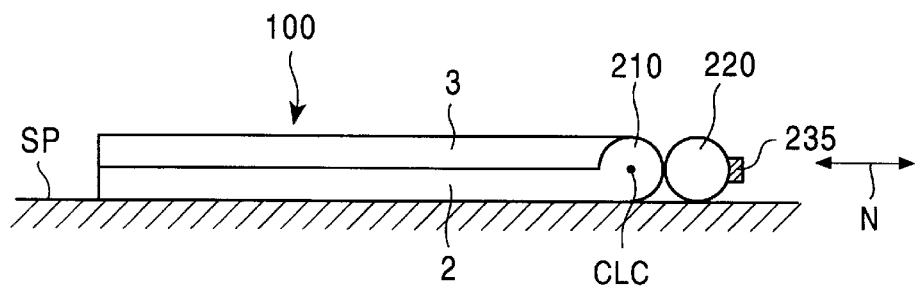
FIG. 16A illustrates the computer being closed.
Figure 16B:
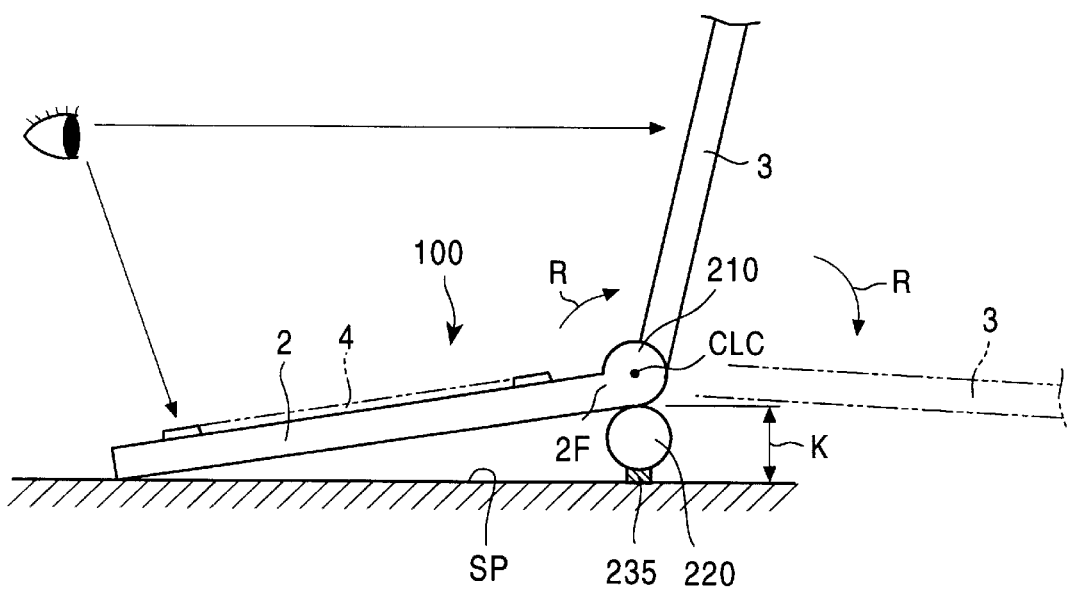
FIG. 16B illustrates the computer with its body being raised as a result of rotating the short battery portion.

As shown in FIG. 14 and FIG. 16A, when, for example, the display portion 3 is folded upon the body 2 in order to store or carry around the computer, the long battery portion 220 and the short battery portion 210 are disposed along the forward-and-backward direction of the body 2 and the display portion 3, in the direction of arrow N.

Figure 15:
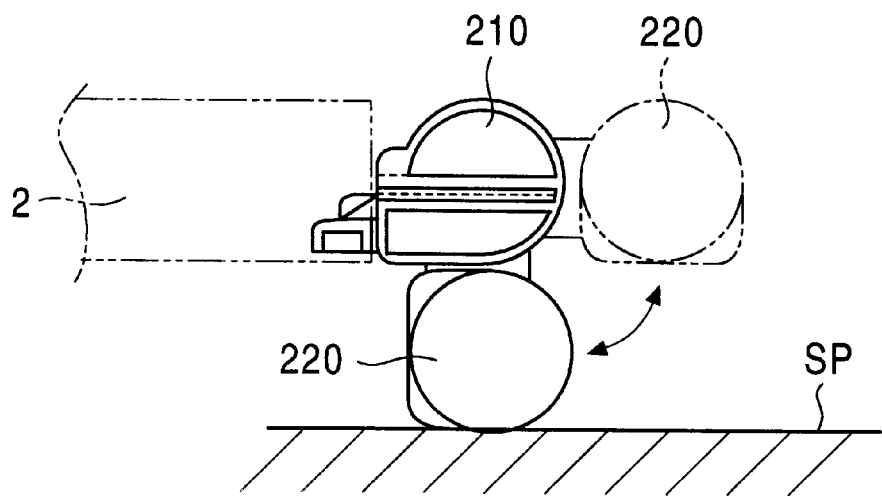
FIG. 15 illustrates the body being raised from the supporting surface as a result of rotating the short battery portion.

On the other hand, as shown in FIGS. 15 and 16B, when the computer 100 is placed on, for example, a table for actual use, the user opens and raises the display portion 3 with respect to the body 2 in the direction of arrow R, and rotates the long battery portion 220 with respect to the short battery portion 210 by about 90 degrees.

Accordingly, since the long battery portion 220 alone is moved so as to be disposed below the back end 2F of the body 2, the back end 2F of the body 2 can be lifted above a supporting surface SP by a predetermined height K. This allows the user to operate the keyboard more easily, and facilitates the use of the computer 100. Here, since the anti-slippage means 235 are in contact with the supporting surface SP, the computer 100 itself does not move easily. In addition, only the long battery portion 220 needs to be rotated, thereby making it unnecessary to rotate the entire battery pack 200 with respect to the body, thereby facilitating operation of the computer 100.

Figure 17:
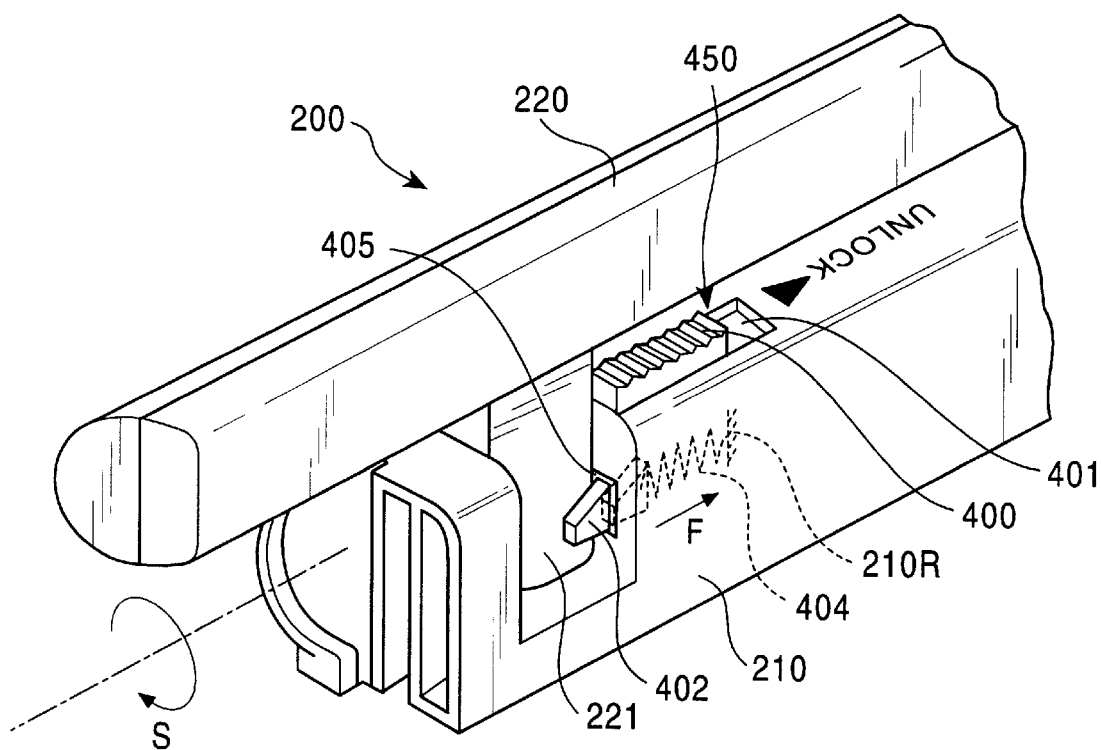
FIG. 17 is a perspective view of an antirotation means.

FIG. 17 shows one of the joining portions of the battery portions 210 and 220 and one of the antirotation mechanism 450. In FIG. 17, in the vicinity of the protrusion 221 of the battery portion 220, an unlock slider 400 is disposed in the recess 401 in the battery portion 210 case. The unload slider 400 can force the stopper member 402 to move in the direction of arrow F.

The stopper member 402 is pushed with respect to a securing portion 210R of the battery portion 210 by a biasing means 404, such as a spring, in a direction opposite to the direction of arrow F.

This causes the stopper member 402 to protrude from a hole 405 in the case of the battery portion 201 towards the protrusion 221. The stopper member 402, the unlock slider 400, the biasing means 404, etc., compose antirotation mechanism 450 which prevents rotation of the long battery portion 220 with respect to the short battery portion 210 in the direction of arrow S.

Figure 21:
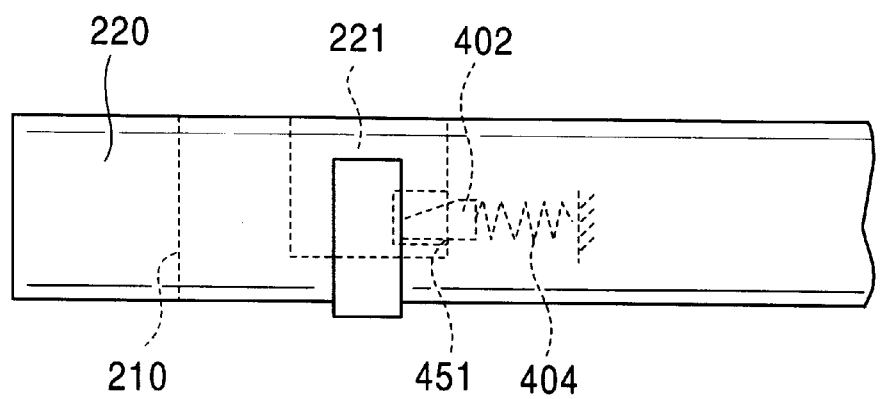
FIG. 21 is a front view showing a state in which the protrusion of the long battery portion is locked by the stopper member.
Figure 22:
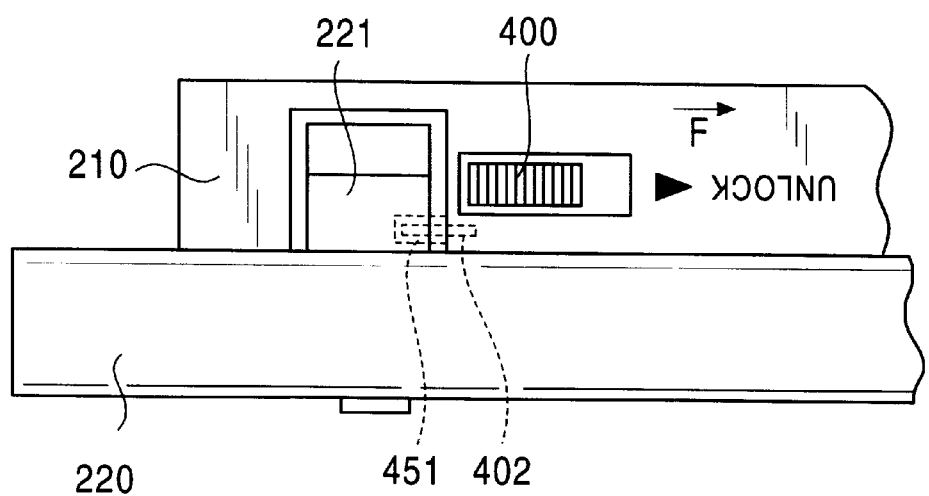
FIG. 22 is a plan view showing a state in which the protrusion of the long battery portion is locked by the stopper member.

As shown in FIGS. 21 and 22, the antirotation mechanism 450 further has a hole 451 which is formed in the protrusion 221. When the long battery portion 220 has rotated with respect to the short battery portion 210 by 90 degrees in the direction of arrow S (see FIG. 15), the stopper 402 is such as to fit into the hole 451. The user can move the stopper member 402 out of the hole 451 by moving the unlock slider 400 in the direction of arrow F.

A description will now be given of an example of an operation of the antirotation mechanism 450 with reference to FIGS. 17 to 22.

As shown in FIG. 14, when the aforementioned long battery portion 220 is disposed parallel to the short battery portion 210, the body 2 and the battery portions 210 and 220 are placed on the supporting surface SP in a row. As shown in FIGS. 14 and 15, when the back end of the body 2 is to be lifted from the supporting surface SP in order to be supported thereabove, the long battery portion 220 is rotated by an angle of 90 degrees with respect to the short battery portion 210, as described above.

Figure 19:
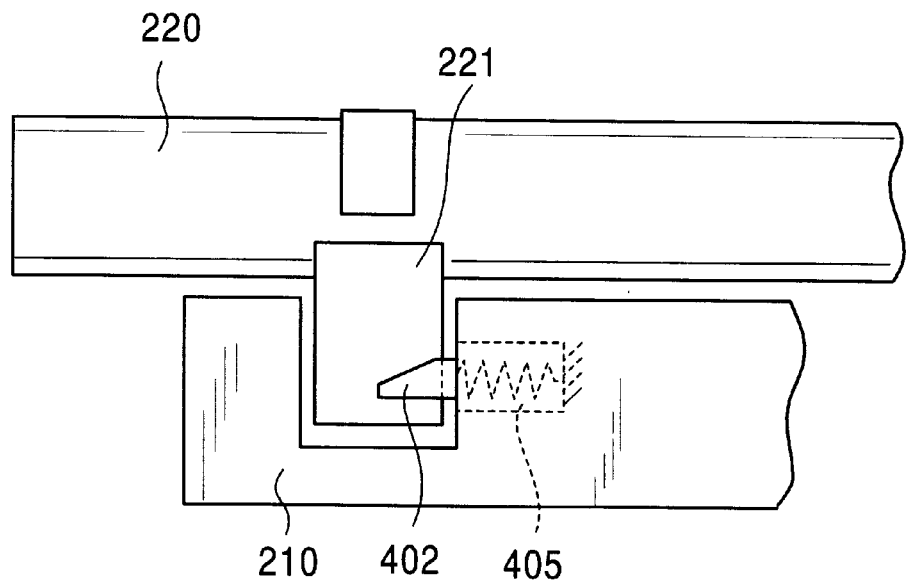
FIG. 19 shows a state in which the stopper member of the antirotation means holds the long battery portion.
Figure 20:
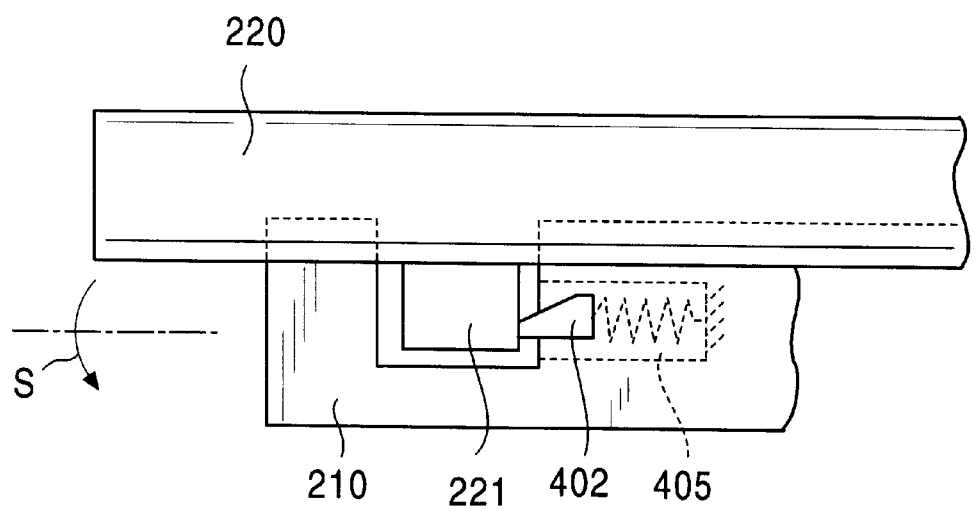
FIG. 20 shows a state in which the stopper member of the antirotation means is pushed in by the protrusion of the long battery portion.

FIGS. 17 and 19 show the relative position of the battery portions 210 and 220 of FIG. 14. Here, the stopper member 402 is in contact with the front face of the protrusion 221 of the long battery portion 220.

Figure 18:
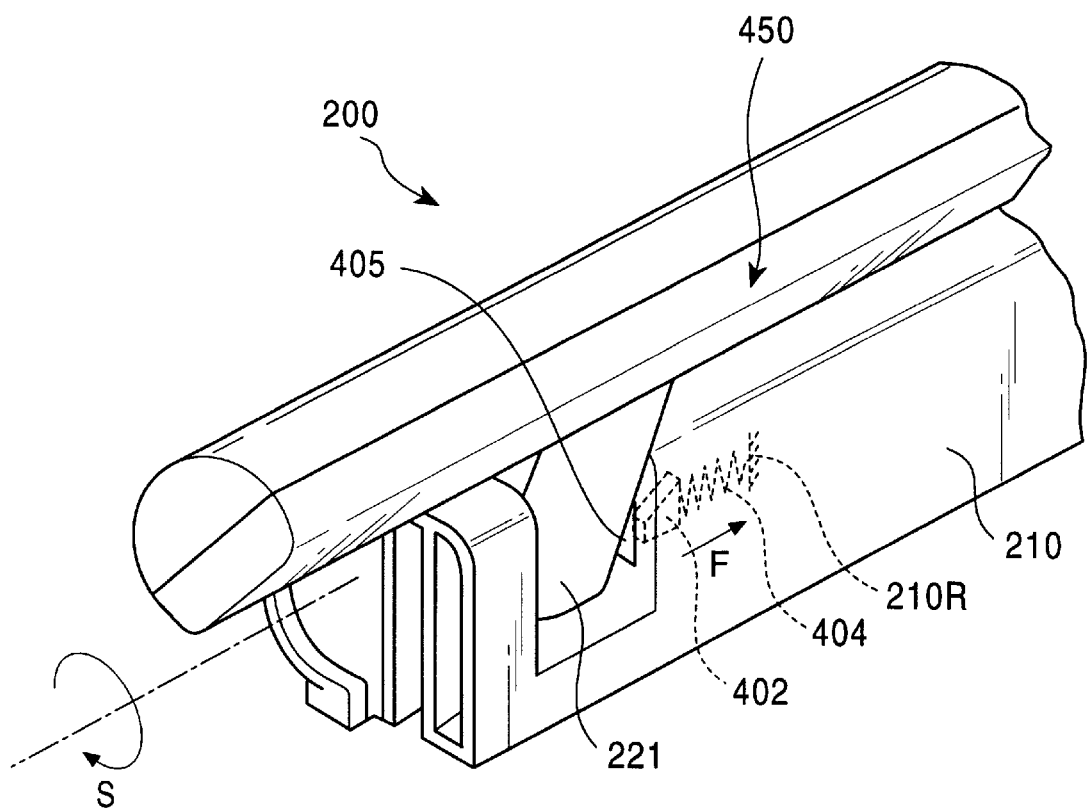
FIG. 18 shows a state in which a stopper member of the antirotation means is pushed in by a protrusion of the long battery portion.

As shown in FIGS. 14 and 15, when the user wants to support the body 2 such that the back end 2F of the body 2 is raised, the user rotates a small amount at a time the long battery portion 220, in the direction of arrow S, as shown in FIGS. 17 and 18. Here, the protrusion 221 forcefully pushes in the stopper member 402 of the antirotation mechanism 450 in the direction of arrow F, causing the stopper member 402 to move away from the protrusion 221 and into the hole 405.

Here, the stopper member 402 is triangular in shape, as shown in FIG. 17, so that rotation of the long battery portion 220 causes the protrusion 221 to push in the stopper member 402 in the direction of arrow F.

As the stopper member 402 is pushed into the hole 405, the long battery 220 rotates in the direction of arrow S with respect to the short battery portion 210. Eventually, the long battery 220 rotates to an angle of about 90 degrees, as shown in FIGS. 21 and 22.

When the long battery portion has been rotated to about an angle of 90 degrees, the stopper member 402 is fitted into the hole 451 in the protrusion 221 of the long battery portion 220, by the force of the biasing means 404. Accordingly, when the long battery portion 220 is set vertically below the short battery portion 210, as shown in FIG. 15, the action of the stopper member 402 of FIGS. 21 and 22 causes the long battery portion 220 to be automatically locked so that that it does not move in the original direction. Therefore, it is possible to reliably tilt and support the back end 2F of the body 2 with respect to the supporting surface SP, and eliminate troubles caused by sudden dropping of the back end 2F resulting from the battery portion 220 returning back to its original state during operation of the computer.

When the user wants to restore the body 2 from the state of FIG. 15 back to the state of FIG. 14, the user slides the unlock slider 400 of FIGS. 22 and 17 in the direction of arrow F with his or her finger in order to forcefully move the stopper member 402 out the hole 451. This allows the user to rotate the long battery portion 220 with respect to the short battery portion 210 by about 90 degrees in a direction opposite to the direction of arrow S, whereby the body 2 is restored back to the state of FIG. 14.

Figure 23:
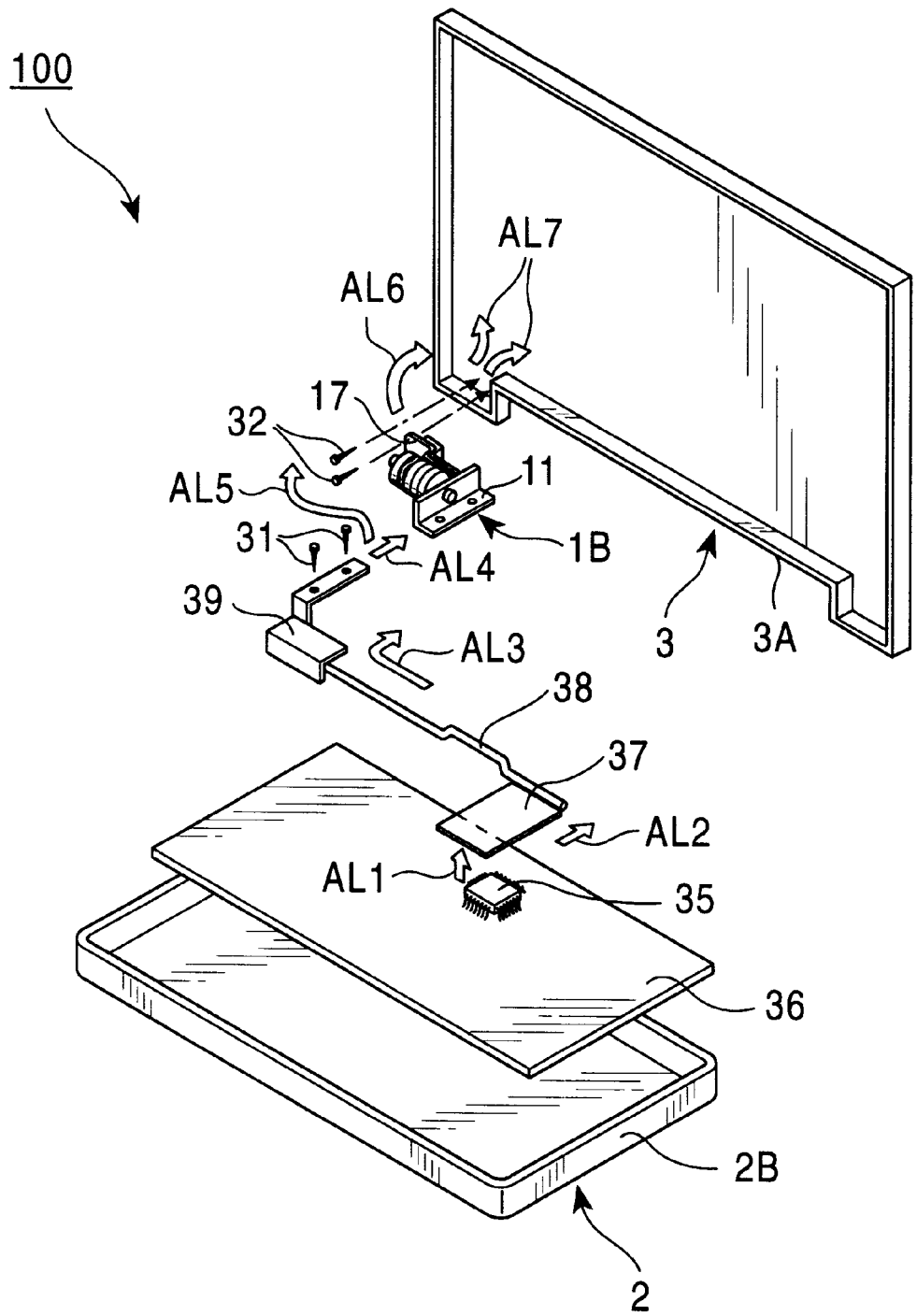
FIG. 23 is a perspective view of the body, the display body case, and electrical heating and mechanically joining hinges, etc.

FIGS. 4, 5, and 23 illustrate a central processing unit (CPU) 35, serving as heat-generating source in the electronic device of the present invention, a case 2B of the body 2, the hinge 1B, and the case 3A of the display portion 3. FIG. 4 illustrates an example of a process in which heat, generated as a result of driving the central processing unit 35 serving as a heat-generating source, is either radiated or dissipated from a base 36, having mounted thereto the central processing unit 35, towards the case 3A of the display portion 3, through the hinge 1B or the like.

More specifically, the base 36 is disposed in the case 2B of FIG. 23, with the central processing unit 35 being mounted on the base 36. The case 3A and the case 2B are mechanically joined together by the hinges 1A and 1B (the hinge 1A is not shown) so as to allow opening and closing operations, and are designed to allow conduction of heat of the central processing unit 35 from the base 36 towards the case 3A.

In FIGS. 4 and 5, the central processing unit 35 is disposed at virtually the center of the base 36, so that the central processing unit 35 is separated from the hinge 1B. At the central processing unit 35 side, a heat-receiving plate 37 for receiving the heat from the central processing unit 35, a heat pipe 38, and a connector 39 are disposed between the hinge 1B and the central processing unit 35. The heat-receiving plate 37 is disposed above the central processing unit 35, at a predetermined distance therefrom. The heat-receiving plate 37 and the connector 39 are connected by the heat pipe 38. The heat pipe 38 and the heat-receiving plate 37 are made of metal which conducts heat well, such as copper. The heat-receiving plate 37 is larger than the central processing unit 35.

The connector 39 is also made of a metal which conducts heat well, such as copper, and can be secured to the case 2B side of the body 2 by screwing screws 31 into a fixed portion 11 of the hinge 1B.

A movable portion 17 of the hinge 1B is secured to the inside of the case 3A using screws 32.

As will be described below, the hinge 1B is capable of efficiently conducting heat from the fixed portion 11 side towards the movable portion 17.

A description will now be given of how heat, generated at the central processing unit 35, is transferred towards the case 3A, with reference to FIG. 23.

Heat, generated by the central processing unit 35 as a result of driving it, is transferred in the direction of arrow AL1 and received by the heat-receiving plate 37. The heat, received by the heat-receiving plate 37, is transferred towards the fixed portion 11 of the hinge 1B, through the heat pipe 38 and the connector 39, as indicated by arrows AL2, AL3, and AL4.

From the fixed portion 11 side of the hinge 1B, the heat is transferred towards the movable portion 17, in the direction of arrow AL5, after which it is transferred towards the case 3A, as indicated by arrow AL6. From the movable portion 17, the heat, which is transferred in the direction of arrow AL7, is radiated or dissipated at the case 3A.

Accordingly, transferring the heat from the body 2 side where there is a relatively large amount of heat towards the display portion 3 where there is a relatively small amount of heat prevents heat leakage in the body of the computer 100 serving as electronic device 1, so that heat is easily dissipated towards the display portion 3. Therefore, heat dissipation can be easily achieved using only hinges, thereby eliminating the need for special devices such as a heat sink or a conducting fan.

Although in FIG. 23 only the hinge 1B is used for heat conduction, it is obvious that both of the hinges 1A and 1B may be used for heat conduction.

It is to be noted that the case 2B of the body 2 is also called a bottom cabinet, the base 36 is also called a main base, and the case 3A of the display portion 3 is also called an outside cabinet.

A description will now be given of a specific structure of the hinges 1A and 1B, with reference to FIGS. 24 to 26.

The hinges 1A and 1B of FIG. 1 mechanically join the display portion 3 to the back end 6 of the body 2, and are designed to conduct or dissipate heat.

The hinges 1A and 1B, which are symmetrically formed on the left and right sides, have essentially the same structure. Therefore, only the structure and features of the hinge 1A are described, with reference to FIGS. 24 to 26.

Figure 24:
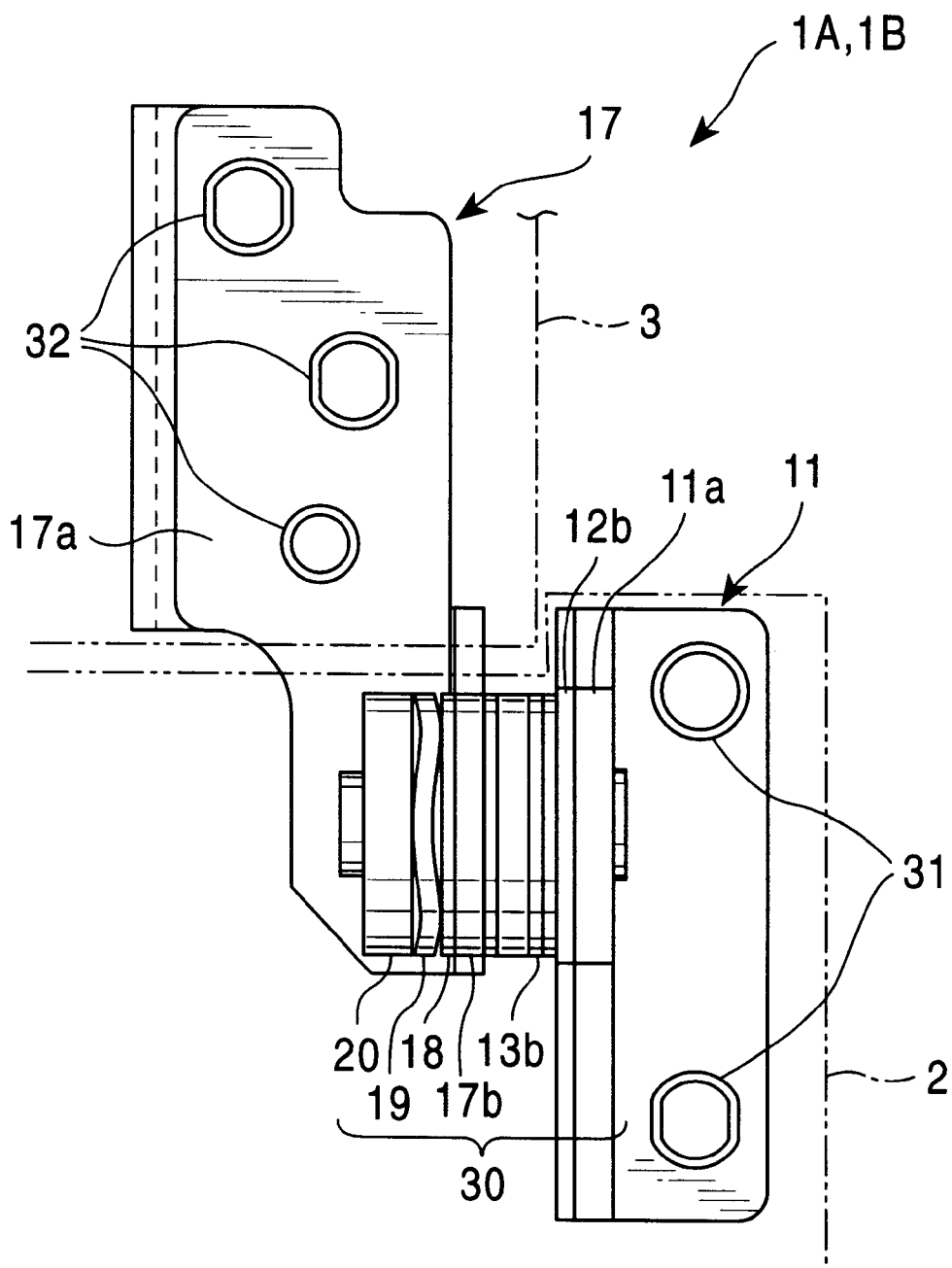
FIG. 24 is a plan view of a preferred form of the hinge (or hinges) applied to the electronic device of FIG. 1.
Figure 25:
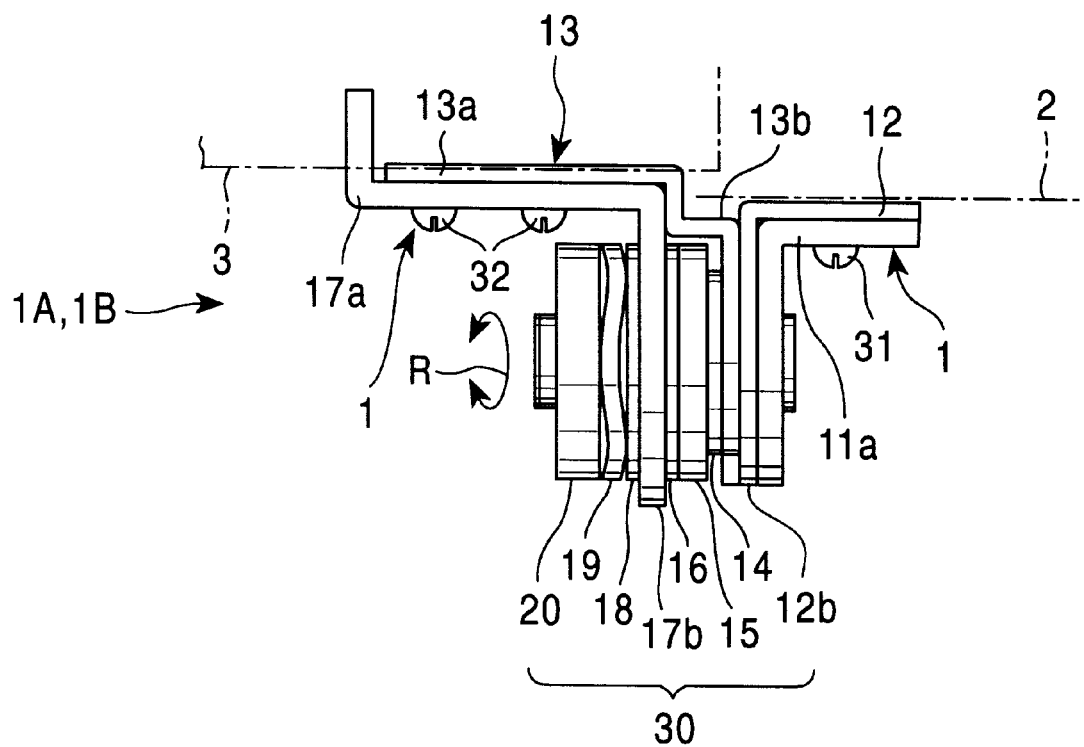
FIG. 25 is a side view of the hinge (or hinges).

As shown in FIGS. 24 and 25, the hinge 1A has fixed portion 11, movable portion 17, and a coupling portion 30. The coupling portion of FIG. 26 is used for coupling the fixed portion 11 and the movable portion 17 in a mechanical fashion so as to make possible heat conduction.

The fixed portion 11 is composed of a strength retaining portion 11a for retaining mechanical strength, and a heat-conducting portion 12 for conducting heat. It is preferable that the strength retaining portion 11a be made of a material having high mechanical strength, such as stainless steel (SUS) being an iron type material, in order to retain the strength of the strength-retaining portion 11a, during opening and closing operations, and to maintain the opening and closing operations. The strength retaining portion 11a, which is composed of a plate-shaped material with high mechanical strength, is formed into a substantially L shape in cross section.

The heat-conducting portion 12 is preferably made of a material which is suitable for heat conduction, such as a copper type or an aluminum type material. It is formed into the shape of a plate, and is substantially L-shaped in cross section in order to bring it into close contact with and to secure It to, or to secure it to, or set it at the strength retaining portion 11a.

The strength retaining portion 11a of the fixed portion 11 and the heat-conducting portion 12 are brought into close contact for use, with the fixed portion 11 being secured to the body 2 mounting surface side (or the side contacting the body) using, for example, screws 31.

Figure 26:
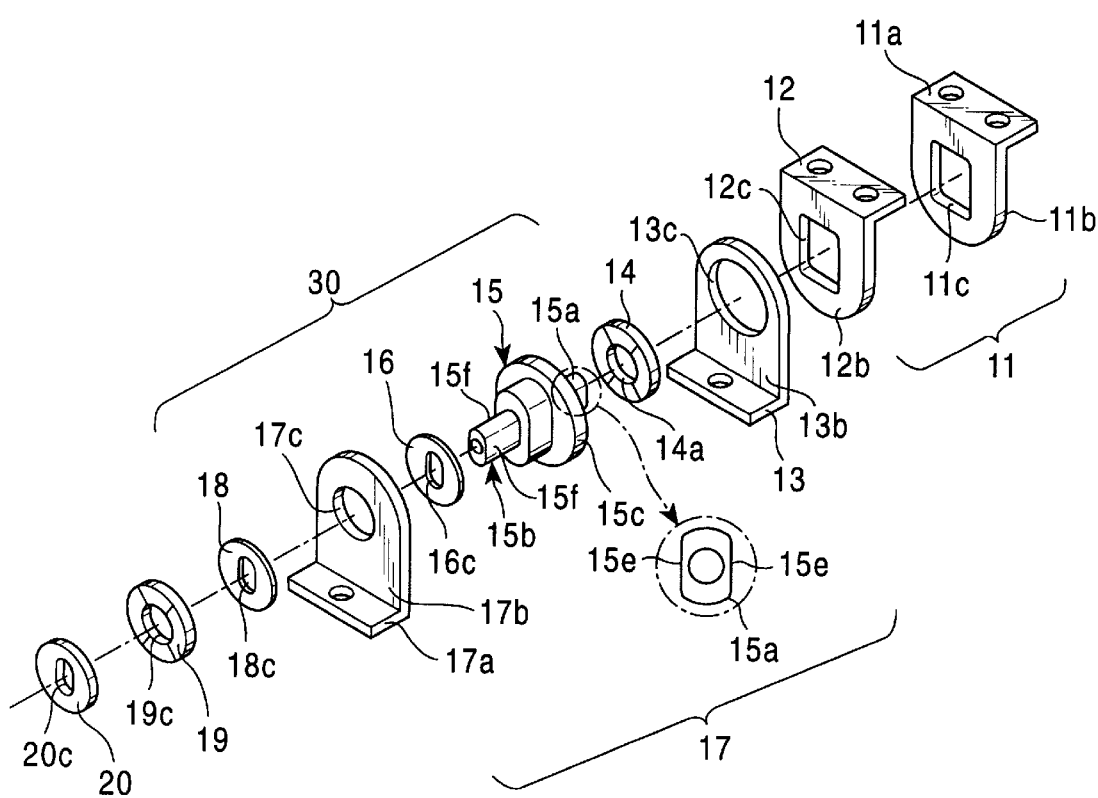
FIG. 26 is an exploded perspective view of the hinge (or hinges).
Figure 27:
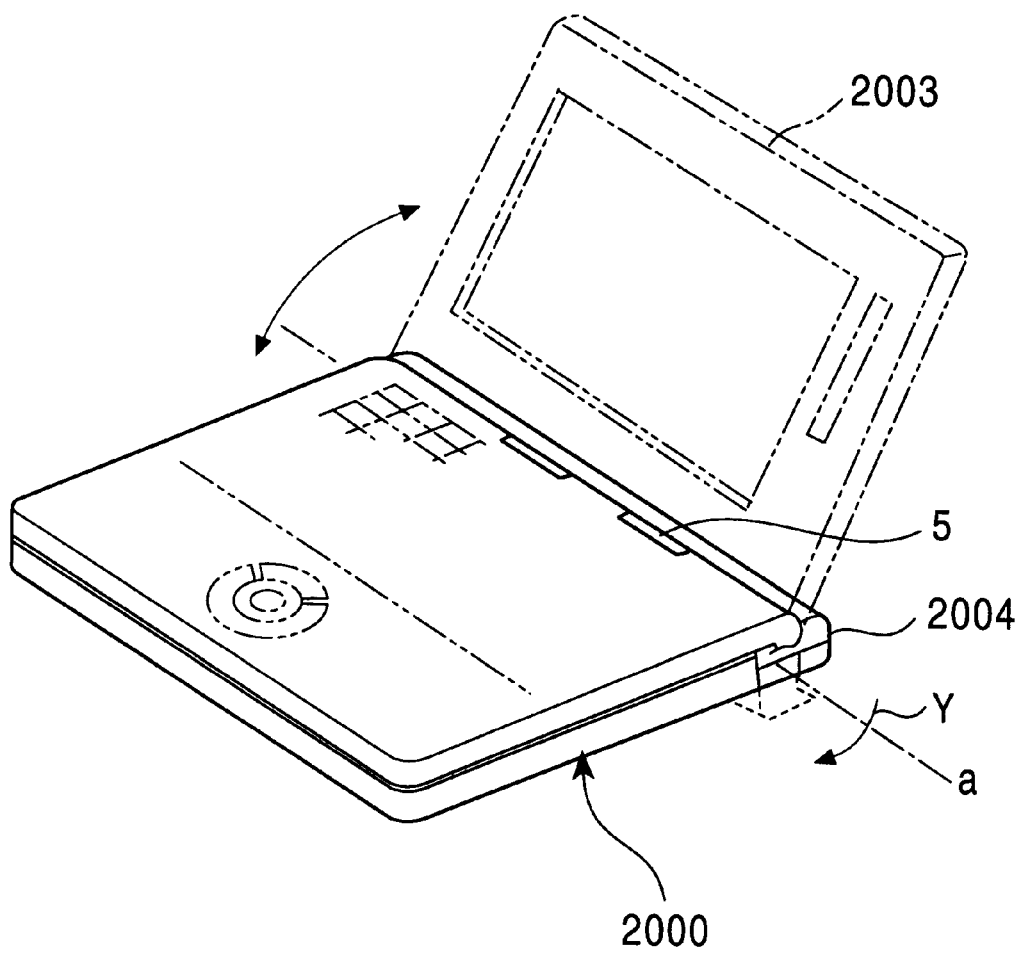
FIG. 27 is a perspective view of a conventional computer with a battery pack.
Figure 28:
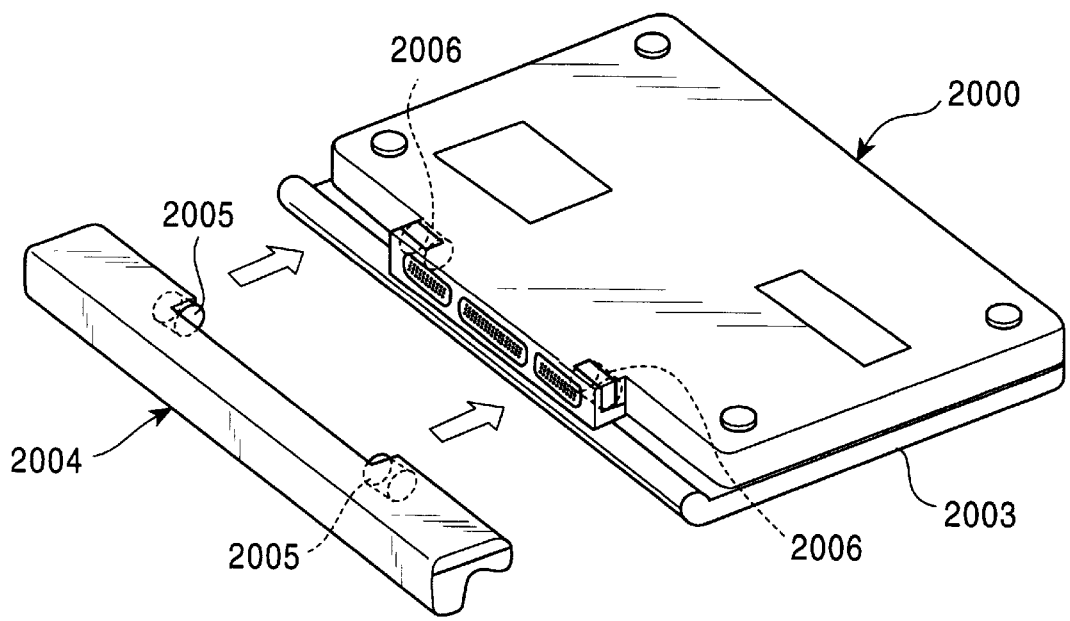
FIG. 28 is an exploded view of the conventional computer and the battery pack of FIG. 27.

FIG. 26 is a perspective view showing a form of the strength retaining portion 11a of the fixed portion 11 and the heat-conducting portion 12. Rectangular holes 11c and 12c are formed in an upstanding portion 11b of the strength retaining portion 11a and the upstanding portion 12b of the heat-conducting portion 12, respectively.

A description will now be given of the movable portion 17. As shown in FIGS. 24 and 25, the movable portion 17 has a strength retaining portion 17a and a heat-conducting portion 13. The strength-retaining portion 17a is provided for retaining mechanical strength, whereas the heat-conducting portion 13 is provided for conducting heat. The strength retaining portion 17a is preferably made of a material with high mechanical strength, such as stainless steel (SUS) being an iron type material, in order to retain the strength thereof and the strength thereof when the display portion is being opened and closed.

The heat-conducting portion 13 is made of a material with good heat conductivity, such as copper or aluminum type material. The strength-retaining portion 17a, as well as the heat-conducting portion 13, is substantially L-shaped in cross section. A portion 13a of the heat-conducting portion 13 is brought into close contact with the strength-retaining portion 17a, whereas an upstanding portion 13b of the heat-conducting portion 13 is used so as to be separable from an upstanding portion 17b of the strength-retaining portion 17a.

FIG. 26 shows, three dimensionally, the strength-retaining portion 17a of the movable portion 17 and the heat-conducting portion 13. Circular holes 17c and 13c are formed in the upstanding portion 17b of the strength-retaining portion 17a and the upstanding portion 13b of the heat-conducting portion 13, respectively. It is to be noted that the diameter of the hole 17c is smaller than the diameter of the hole 13c.

A description will now be given of the engaging portion of FIGS. 24 and 25.

The engaging portion 30 is capable of mechanically joining the fixed portion 11 and the movable portion 17, while allowing heat conduction between the heat-conducting portion 12 of the fixed portion 11 and the heat-conducting portion 13 of the movable portion 17.

FIG. 26 shows the structural members of the engaging portion 30, which are a spring washer 14, a shaft 15, washers 16 and 18, a spring washer 19, and a stopper 20.

The shaft 15 is made of, for example, iron in order to, for example, retain mechanical strength, and has a projection 15a and a projection 15b, formed opposite to the projection 15a, both of which are provided with respect to a body 15c of the shaft 15. The projection 15a passes through a hole 14a in the spring washer 14, a hole 13c in the heat-conducting portion 13, the hole 12c in the heat-conducting portion 12, and the hole 11c in the strength-retaining portion 11a. The projection 15a has end surfaces 15e shaped to allow the projection 15a to be firmly fitted into the hole 12c in the heat-conducting portion 12 and the hole 11c in the strength-retaining portion 11a so that the heat-conducting portion 12 does not move. Accordingly, the projection 15a of the shaft 15 can be firmly fitted into the hole 12c in the heat-conducting portion 12a and the hole 11c in the strength-retaining portion 11a so that it does not move out of the holes 12c and 11c.

The spring washer 14 is used for holding down the heat-conducting portion 12 of the fixed portion 11 and the heat-conducting portion 13 of the movable portion 17 so that they are in close contact, and is made of a metal, such as iron.

The washer 16 is disposed between the shaft 15 and the strength-retaining portion 17a of the movable portion 17. The washer 16 has a hole 16c, which is rectangular in shape to allow insertion of the projection 15b of the shaft 15 therein. The projection 15b of the shaft 15 has planar end surfaces 15f. The projection 15b passes through the hole 17c in the strength-retaining portion 17a, a hole 18c in the washer 18, and a hole 19c in the spring washer 19, so that it can be reliably fitted into a hole 20c in the stopper 20. In other words, the projection 15b of the shaft 15 is reliably secured at the hole 20c in the stopper 20 so that it does get dislodged.

Accordingly, the fixed portion 11 and the movable portion 17 can be integrally coupled together by engaging the projection 15a of the shaft 15 and the hole 11c in the strength-retaining portion 11a and engaging the projection 15b of the shaft 15 and the hole 20c in the stopper 20. The shaft 15 allows rotation of the movable portion 17 with respect to the fixed portion 11 in the R directions in FIG. 16.

The shaft 15, the washers 16 and 18, the spring washers 14 and 19, and the stopper 20 are made of, for example, an iron-type material with high mechanical strength. The heat-conducting portion 12 of the fixed portion 11 is positioned at the body 2 mounting surface side of the computer 100 of FIG. 1 (or the side contacting the body), and can be secured thereto with the screws 32, as shown in FIGS. 24 and 25. On the other hand, the heat-conducting portion 13a of the movable portion 17 is positioned at the display portion 3 mounting surface side of the computer 100 of FIG. 1 (or surface for mounting to display portion), and can be secured thereto with the screws 32.

As shown in FIGS. 24 and 25, when either the hinge 1A or the hinge 1B is in an assembled state, the upstanding portion 12b of the heat-conducting portion 12 of the fixed portion 11 and the upstanding portion 13b of the heat-conducting portion 13 of the movable portion 17 are in close contact with each other due to the pressing force of the spring washer 14, making it possible to make thermal resistance at the contact portion of the upstanding portions 12b and 13b of their respective heat-conducting portions 12 and 13 as small as possible.

Such hinges 1A and 1B are capable of retaining mechanical strength and conducting and dissipating heat, so that heat conduction between, for example, the body 2 of the computer 100 and the display portion 3 can be improved by allowing easy transfer of heat from a location where there is a larger amount of heat, such as the body 2, to a location where there is a smaller amount of heat, such as the display portion 3.

By improving heat conductivity, heat can be easily transferred from the body 2 where a larger amount of heat is generated to the display portion 3 where a smaller amount of heat is generated, thereby providing a location for heat dissipation, and allowing new heat-dissipating means such as a heat sink to be provided at the heat-conducting portion 12 and the heat-conducting portion 13, so that heat can be dissipated with greater efficiency.

For example, when the cases 2A and 3A of the body 2 and the display portion 3 of FIG. 23, respectively, are made of a light metal, such as magnesium, these cases 2A and 3A, themselves, can be used as heat sinks, which, when thermally connected to the heat-conducting portion 12 and the heat-conducting portion 13 of FIG. 26, can further increase the heat-dissipating effect.

It is a general rule that materials with good heat conductivity have low electrical resistance, so that the fixed portion 11 and the movable portion 17 of each of the hinges 1A and 1B can be coupled together with lower electrical resistance.

When, for example, the entire case 3A of FIG. 23 is made of a metal with good heat conductivity, the transferred heat can be dissipated externally of the entire case 3A. Here, it is preferable to use magnesium alloy for the case 3A. Magnesium materials, such as AZ91D, may be used for the magnesium alloy. The heat conductivity of the magnesium thereof is 157 W/mK. The thickness of the case 3A is, for example, 1.2 mm. The dimensions of the case 3A are, for example, 259 mm×208.6 mm×23.9 mm. Usable central process units include, for example, a Pentium processor 133 MHz, a trade name of an Intel product. The Pentium processor 133 MHz generates about 6 W of heat per unit time.

In the illustrated electronic device battery of the present invention, one long battery portion 220 is joined to the short battery portion 210 through hinges. Like the short battery portion 210, the long battery portion 220 is substantially circular in cross section. However, the form of the long battery portion 220 is not limited thereto. The long battery portion 220 may, for example, be square-shaped, rectangular, or polygonal in cross section. As long as the length of the long battery portion 220 is shorter than or equal to the width of the body, the length of the long battery portion 220 is not particularly limited.

Obviously, two or more rows of long battery portions 220 may be joined to the short battery portion 210.

When the portable electronic device is being carried around, a battery is used as the power source. In general, a plurality of battery cells contained in a battery pack are used. The problem in driving an electronic device using battery cells lies in the life of the battery cells. In the present invention, this problem is overcome by mounting many battery packs, thereby allowing the electronic device to be operated for a long time.

The present invention is not limited to the above-described embodiments.

In the illustrated embodiments, a portable computer is used as the electronic device to which the hinges of the present invention are applied. However, other types of electronic devices may also be used. They include those which generate heat, such as portable information terminals, portable telephones, and radio devices.

As can be understood from the foregoing description, according to the present invention, a simple structure for electrically connecting a battery to a body may be used to easily raise the back end of the body of the electronic device and tilt the body as a result of rotating part of the battery. In addition, an antirotation means is provided for automatically preventing rotation of a second battery portion when the back end of the body is supported above a supporting surface as a result of rotating the second battery portion with respect to the first battery portion. Therefore, it is possible to prevent the second battery portion in a raised state from accidentally returning back to its original position during operation of the body of the electronic device.

What is claimed is:

1. An electronic device, comprising:
    a body;
    a display portion which is openably and closably provided with respect to said body;
    a first battery portion which is provided at the back end of said body,
    a second battery portion which is rotatably supported by said first battery portion; and
    wherein said first battery portion is removably disposed between at least one pair of opening-and-closing mechanical portions which openably and closably support said display portion with respect to said body.

2. An electronic device according to claim 1, wherein the at least one pair of opening-and-closing mechanical portions include hinge mechanisms.

3. An electronic device according to claim 1, wherein said second battery portion, which has been rotated with respect to said first battery portion, supports the back end of said body above a supporting surface in order to tilt and support said body with respect to the supporting surface.

4. An electronic device according to claim 1, wherein said first battery portion, disposed between the at least one pair of opening-and-closing mechanical portions, is mechanically and electrically connected at the body side so as to be removable from said body.

5. An electronic device according to claim 2, wherein said first battery portion is removably provided by making said first battery portion slidable with respect to the at least one pair of opening-and-closing mechanical portions disposed at said body.

6. An electronic device according to claim 1, wherein said electronic device is a portable computer.

7. An electronic device according to claim 1, wherein said display portion includes a liquid crystal display.

8. An electronic device according to claim 1, wherein said first battery portion has an electrical connecting terminal which is electrically connected to an electrical terminal of said body, and wherein said electronic device further comprises a guiding mechanical portion for removably mounting the ends of said first battery to the at least one pair of opening-and-closing mechanical portions.

9. An electronic device according to claim 3, further comprising antirotation means for automatically preventing rotation of said second battery portion with respect to said first battery portion, while the back end of said body Is supported above the supporting surface as a result of rotating said second battery portion with respect to said first battery portion.

10. An electronic device according to claim 8, wherein said first battery portion has grooves formed in the ends thereof, and wherein the at least one pair of opening-and-closing mechanical portions have protrusions which are mechanically fitted to said corresponding grooves at the ends of said first battery portion.

11. An electronic device according to claim 8, wherein said first battery portion has a mounting portion, said mounting portion being disposed in the vicinity of said electrically connecting terminal of said first battery portion, and said mounting portion being fitted into a recess of said body.

12. An electronic device according to claim 8, wherein said first battery portion is removably provided by making said first battery portion movable between the at least one pair of opening-and-closing mechanical portions, disposed at said body, in straight lines, through said guiding mechanical portion.

13. An electronic device according to claim 11, wherein said mounting portion and said electrically connecting terminal of said first battery portion are formed in a row on a surface of said battery which contacts the back end of said body.

14. An electronic device battery which is used by removably mounting said electronic device battery with respect to a portable electronic device comprising a body and a display portion which is openably and closably provided with respect to the body, said electronic device battery, comprising:
a first battery portion which is disposed at the back end of the body;
a second battery portion which is rotatably supported by said first battery portion; and
wherein said first battery portion is disposed between at least one pair of opening-and-closing mechanical portions which openably and closable support the display portion with respect to the body of the electronic device.

15. An electronic device battery according to claim 14, wherein said first battery portion, disposed between the at least one pair of opening-and-closing mechanical portions, is mechanically and electrically connected at the body side of the electronic device so as to be removable from the body.

16. An electronic device battery according to claim 14, wherein said first battery portion is removably provided by making said first battery portion slidable with respect the at least one pair of opening-and-closing mechanical portions disposed at the body.

17. An electronic device battery according to claim 14, wherein the at least one pair of opening-and-closing mechanical portions are hinges.

18. An electronic device battery according to claim 14, wherein said second battery portion, which has been rotated with respect to said first battery portion, supports the back end of the body of the electronic device above a supporting surface in order to tilt and support the body with respect to the supporting surface.

19. An electronic device battery according to claim 18, further comprising antirotation means for automatically preventing rotation of said second battery portion with respect to said first battery portion while the back end of the body is supported above the supporting surface as a result of rotating said second battery portion with respect to said first battery portion.

20. An electronic device, comprising:
a body;
a display portion which is openably and closably provided with respect to said body;
a first battery portion which is provided at the back end of said body;
a second battery portion which is rotatably supported by said first battery portion; and
wherein said first battery portion has an electrical connecting terminal which is electrically connected to an electrical terminal of said body, and wherein said electronic device further comprises a guiding mechanical portion for removably mounting the ends of said first battery to the at least one pair of opening-and-closing mechanical portions.

21. An electronic device according to claim 20, wherein said first battery portion has grooves formed in the ends thereof, and wherein the at least one pair of opening-and-closing mechanical portions have protrusions which are mechanically fitted to said corresponding grooves at the ends of said first battery portion.

22. An electronic device according to claim 20, wherein said first battery portion has a mounting portion, said mounting portion being disposed in the vicinity of said electrically connecting terminal of said first battery portion, and said mounting portion being fitted into a recess of said body.

23. An electronic device according to claim 20, wherein said first battery portion is removably provided by making said first battery portion movable between the at least one pair of opening-and-closing mechanical portions, disposed at said body, in straight lines, through said guiding mechanical potion.

24. An electronic device according to claim 22, wherein said mounting portion and said electrically connecting terminal of said first battery portion are formed in a row on a surface of said battery which contacts the back end of said body.

25. An electronic device battery which is used by removably mounting said electronic device battery with respect to a portable electronic device comprising a body and a display portion which is openably and closably provided with respect to the body, said electronic device battery, comprising:

a first battery portion which is disposed at the back end of the body; and a second battery portion which is rotatably supported by said first battery portion wherein said second battery portion, which has been rotated with respect to said first battery portion, supports the back end of the body of the electronic device above a supporting surface in order to tilt and support the body with respect to the supporting surface.

26. An electronic device battery according to claim 25, further comprising antirotation means for automatically preventing rotation of said second battery portion with respect to said first battery portion while the back end of the body is supported above the supporting surface as a result of rotating said second battery portion with respect to said first battery portion.

27. An electronic device, comprising:

a body;

a display portion which is openably and closably provided with respect to said body;

a first battery portion which is provided at the back end of said body;

a second battery portion which is rotatably supported by said first battery portion; and wherein said first battery portion, disposed between the at least one pair of opening-and-closing mechanical portions, is mechanically and electrically connected at the body side so as to be removable from said body.

* * * * *